(12) United States Patent
Willard

(10) Patent No.: US 7,118,160 B2
(45) Date of Patent: Oct. 10, 2006

(54) SOFT-TOP CONVERTIBLE ROOF SYSTEM FOR AN AUTOMOTIVE VEHICLE

(75) Inventor: Michael T Willard, Harrison Township, Macomb County, MI (US)

(73) Assignee: ASC Incorporated, Southgate, MI (US)

( * ) Notice: Subject to any disclaimer, the term of this patent is extended or adjusted under 35 U.S.C. 154(b) by 340 days.

(21) Appl. No.: 10/646,004

(22) Filed: Aug. 22, 2003

(65) Prior Publication Data
US 2005/0258664 A1    Nov. 24, 2005

Related U.S. Application Data

(60) Provisional application No. 60/409,276, filed on Sep. 9, 2002.

(51) Int. Cl.
*B60J 7/00* (2006.01)

(52) U.S. Cl. ............... 296/107.01; 296/107.07; 296/107.09; 296/146.14; 296/121

(58) Field of Classification Search ......... 296/107.01, 296/107.07, 146.14, 107.15, 107.09, 107.12, 296/121
See application file for complete search history.

(56) References Cited

U.S. PATENT DOCUMENTS

| | | | |
|---|---|---|---|
| 2,185,581 A | | 1/1940 | Bessonneau |
| 2,580,486 A | | 1/1952 | Vigmostad |
| 2,833,593 A | | 5/1958 | Olivier et al. |
| 2,997,337 A | | 8/1961 | Day et al. |
| 4,572,570 A | * | 2/1986 | Trucco .............. 296/107.07 |
| 4,784,428 A | * | 11/1988 | Moy et al. ......... 296/107.07 |
| 4,828,317 A | | 5/1989 | Muscat |
| 4,840,421 A | | 6/1989 | Hennessy |
| 4,930,835 A | | 6/1990 | Bruce et al. |
| D322,055 S | | 12/1991 | Bruce et al. |
| 5,251,952 A | | 10/1993 | Guckel et al. |
| 5,456,516 A | | 10/1995 | Alexander et al. |
| 5,620,226 A | | 4/1997 | Suatter, Jr. |
| 5,772,274 A | | 6/1998 | Tokarz |
| 5,775,767 A | | 7/1998 | Harrison et al. |
| 5,848,819 A | | 12/1998 | Suatter, Jr. |
| 5,947,546 A | | 9/1999 | Hilliard et al. |
| 5,979,968 A | | 11/1999 | Essig et al. |
| 6,095,589 A | | 8/2000 | Kinnanen et al. |
| 6,139,087 A | | 10/2000 | Wolfmaier et al. |
| 6,290,281 B1 | | 9/2001 | Durrani et al. |
| 6,295,713 B1 | | 10/2001 | Hilliard et al. |
| 6,409,248 B1 | * | 6/2002 | Bores ................ 296/122 |
| 6,425,622 B1 | * | 7/2002 | Eberle .............. 296/108 |
| 6,431,635 B1 | | 8/2002 | Nicastri |
| 6,439,643 B1 | * | 8/2002 | Barker .............. 296/116 |
| 6,659,533 B1 | | 12/2003 | Grubbs |

(Continued)

FOREIGN PATENT DOCUMENTS

GB    413467    7/1934

*Primary Examiner*—Lori L Coletta
(74) *Attorney, Agent, or Firm*—Harness, Dickey & Pierce, P.L.C.

(57) ABSTRACT

A preferred embodiment of a convertible roof system for an automotive vehicle includes a convertible roof that covers the vehicle essentially from a front header to a rearmost body panel. A further aspect of the present invention provides a forward top stack linkage mechanism, which when actuated, moves a forwardmost roof bow in such a manner that a surface of the roof bow faces upwardly when the top stack is positioned in an extended position and in a retracted position.

53 Claims, 19 Drawing Sheets

U.S. PATENT DOCUMENTS

| | | |
|---|---|---|
| 6,755,457 B1 | 6/2004 | Gubbs |
| RE38,546 E | 7/2004 | Corder et al. |
| 6,827,391 B1 | 12/2004 | Kohn et al. |
| 6,866,322 B1 | 3/2005 | Willard |
| 2002/0024230 A1* | 2/2002 | Pfertner et al. ........ 296/107.07 |
| 2002/0125732 A1* | 9/2002 | Dietl ..................... 296/107.09 |

* cited by examiner

SOFT-TOP CONVERTIBLE ROOF SYSTEM FOR AN AUTOMOTIVE VEHICLE

BACKGROUND AND SUMMARY OF THE INVENTION

The present invention relates generally to automotive roof systems, and more particularly, to a convertible roof system for an automotive vehicle.

Automotive vehicles, such as sport utility vehicles ("SUVs"), have experienced a substantial increase in popularity in recent years. With the increase in popularity has come an increased demand for many of the amenities that were generally only found on other types automotive vehicles, such as convertible roof systems. Convertible roof systems designed for other automotive vehicles, such as passenger cars, are not, however, readily adaptable for use with SUVs because of the significant design differences between the two types of vehicles. For example, many SUVs have a rear storage compartment that is an extension of and accessible from the passenger compartment, whereas in passenger cars the storage compartment is typically separate from the passenger compartment. This connected passenger and storage compartment, however, provides a large roof area. Furthermore, conventional Jeep® brand vehicles present a challenge as to how and where to store the manually retractable convertible top when the top is fully retracted without unnecessarily using up valuable storage and seating space, and they detract from the aesthetic qualities of the vehicle when retracted.

Various convertible roof systems for use with SUVs have been recently developed that attempt to address these and other problems associated with adapting a convertible roof system for use with an SUV. Examples of previously designed SUV convertible roof systems are disclosed in U.S. Pat. No. 6,095,589 entitled "Vehicle And Folding Top For A Vehicle", which issued to Kinnanen et al. on Aug. 1, 2000; and U.S. Pat. No. 5,775,767 entitled "Convertible Top For A Vehicle Having A Rear Egress", which issued to Harrison et al. on Aug. 15, 1996; both of which are incorporated by reference herein. While some of these patents have improved the art, a demand still exists to further simply the operation, improve the functionality and enhance the appearance of convertible roof systems for SUVs.

In accordance with the present invention, a preferred embodiment of a convertible roof system for an automotive vehicle includes a convertible roof that covers the vehicle essentially from a front header to a rearmost body panel. A further aspect of the present invention provides a forward top stack linkage mechanism, which when actuated, moves a forwardmost roof bow in such a manner that a surface of the roof bow faces upwardly when the top stack is positioned in an extended position and in a retracted position. Another aspect of the present invention provides a backlite linkage mechanism that collapses a rear backlite for compact storage within a vehicle storage compartment located behind a rear passenger seat of the vehicle. In yet another aspect of the present invention, operation of a rear backlite linkage mechanism is synchronized with the operation of the forward top stack linkage mechanism.

The automotive vehicle roof system of the present invention is advantageous over previous designs in that the present invention provides a forward top stack and backlite linkage mechanism that utilizes an optimum number of components so as to minimize both the weight and cost of the complete roof system while covering a larger vehicle area than is typical. The invention also provides a novel linkage mechanism for retracting the vehicle's rear backlite that is operated without the need for a separate drive system. The present invention allows for access of the storage compartment from inside the vehicle and from outside the vehicle through a tailgate, when the roof is raised. Furthermore, the present invention is self covering and flush with the vehicle beltline when stowed thereby significantly enhancing the appearance and aerodynamics of the vehicle without the need for a separate tonneau cover or boot. Additional advantages and features of the present invention will become apparent from the following description and appended claims, taken in conjunction with the accompanying drawings. It should be understood that the detailed description and specific examples, while indicating the preferred embodiment of the invention, are intended for purposes of illustration only and are not intended to limit the scope of the invention.

DETAILED DESCRIPTION OF THE PREFERRED EMBODIMENT

Figure 1:
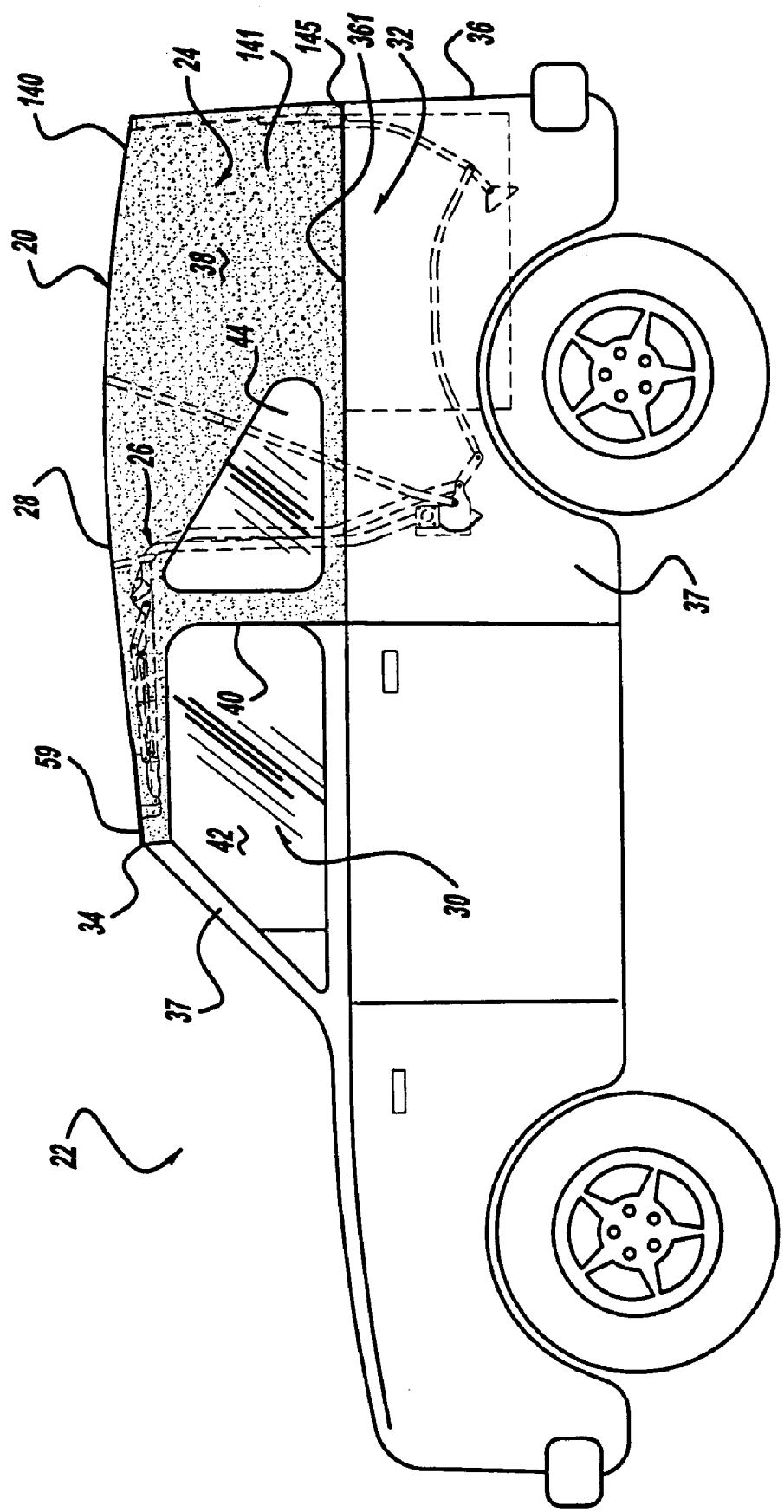
FIG. 1 is a side elevational view showing the preferred embodiment of an automotive vehicle having a convertible roof system, disposed in a fully extended position.

FIG. 1 shows a preferred embodiment of a convertible roof system 20 employed in an automotive vehicle 22, such as a sport utility vehicle or, alternatively, a station wagon or van. Convertible roof 20 includes a pliable cover 24 that is supported by an underlying top stack linkage mechanism 26. Cover 24 is a soft-top style preferably made from a pliable material, such as a twill fabric, or alternately canvas, vinyl or the like. Cover 24 has a substantially horizontal roof panel 28 that covers a passenger compartment 30 and a rear storage compartment 32 of vehicle 22, and extends from a front windshield header 34 to a generally vertically oriented, rear tailgate panel 36 of the vehicle. Header 34 spans between upstanding A-pillars 37. A pair of generally vertically oriented, side roof panels 38 extend from a rear edge 40 of a front passenger side window 42 to a vertical plane defined by rear tailgate 36. A pair of rear side windows 44 are detachably affixed to openings in side panels 38 using zippers, or any other suitable attachment. Side windows 44 are preferably constructed from a transparent pliable material, such as vinyl. Tailgate 36 has a side edge that is hingeably attached to a side body panel 37 of vehicle 22, and another side edge that is a detachably connected to an opposite side body panel by a conventional latching mechanism. Hingeably connecting tailgate 36 to vehicle 22 enables the tailgate to be selectively pivoted between an open and closed position independent of the position of the convertible roof. Alternately, the tailgate can be openly pivoted about a horizontal, lower pivot axis.

Cover 24 is supported by top stack linkage mechanism 26, which is automatically operable for moving convertible roof 20 between an extended and a retracted position. Reference is now made to FIGS. 2–9. Linkage mechanism 26 includes a forward top stack linkage mechanism 46 and a rear backlite linkage mechanism 48. Forward linkage mechanism 46 includes a pair of reverse tri-fold linkage mechanisms 50, each disposed on opposite sides of the vehicle in a spaced apart manner, a number one or forwardmost roof bow 52 spanning cross-car between mechanisms 50, a pair of drive links 54, a pair of balance links 56, a number two roof bow 108 and a number three bow 114. Number one roof bow 52 has a generally flat exterior and upper surface 57 with opposite ends 53 that curve in a downward direction. A middle portion of number one roof bow 52 is oriented in a predominately horizontal and elongated manner in a cross-car direction. Number one roof bow 52 further has a forward edge 58 that adjoins and attaches to windshield header 34 (see FIG. 1) when convertible roof 20 is in its fully extended and raised position through various known latching mechanisms. A leading edge section 59 (see FIG. 1) of convertible roof panel 28 wraps around upper surface 57 of number one roof bow 52 and is suitably attached to the underside of roof bow 52 in a sandwiched manner by a secured trim piece (not shown) or the like. A pair of standoffs 60 are fixedly attached to an underside surface 62 of number one roof bow 52 by bolting, screwing, riveting, welding, or the like.

Figure 4:
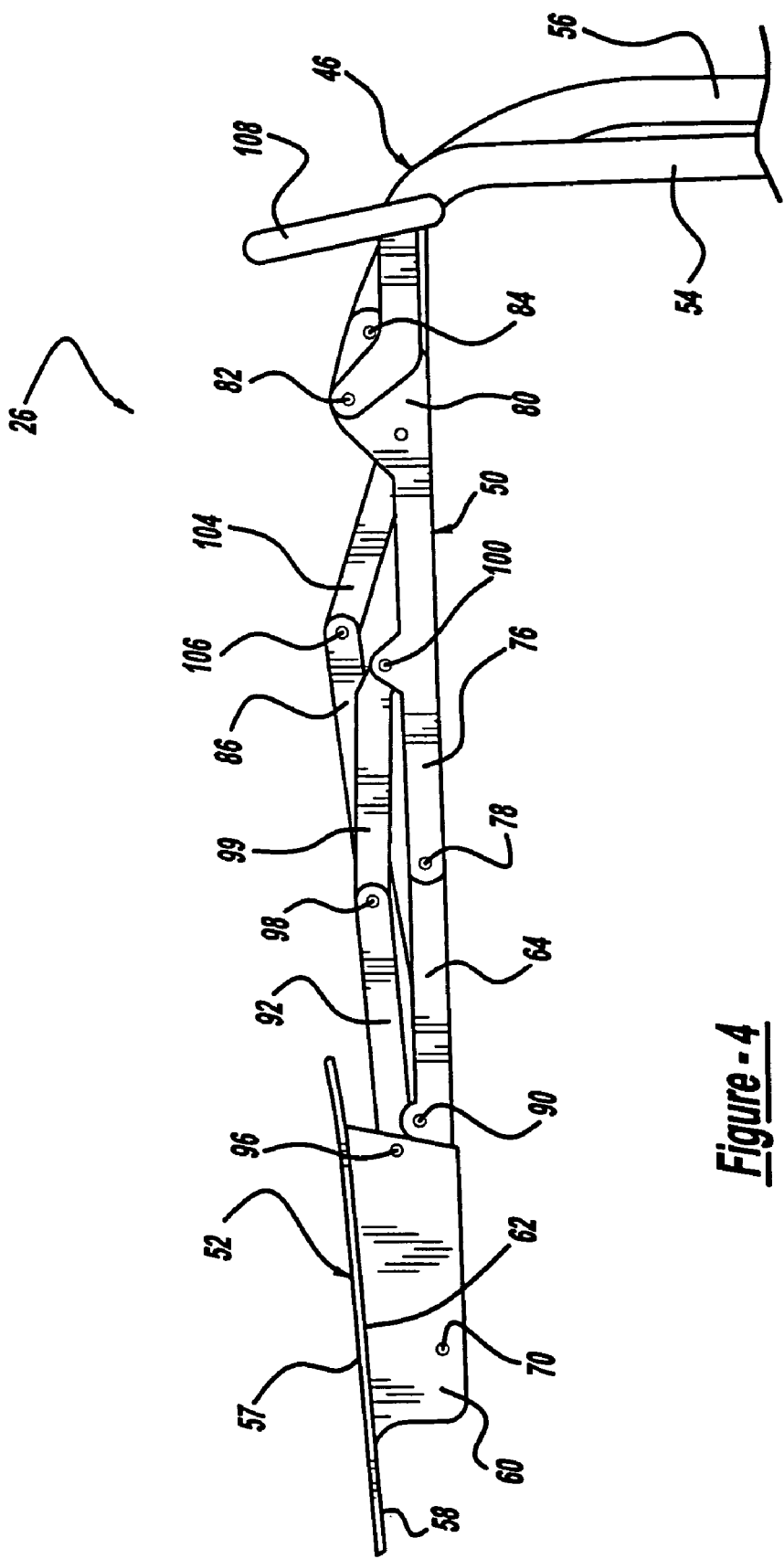
FIG. 4 is a fragmentary, side elevational view showing a reverse tri-fold linkage mechanism employed in the preferred embodiment automotive convertible roof system, disposed in the fully extended position.
Figure 9:
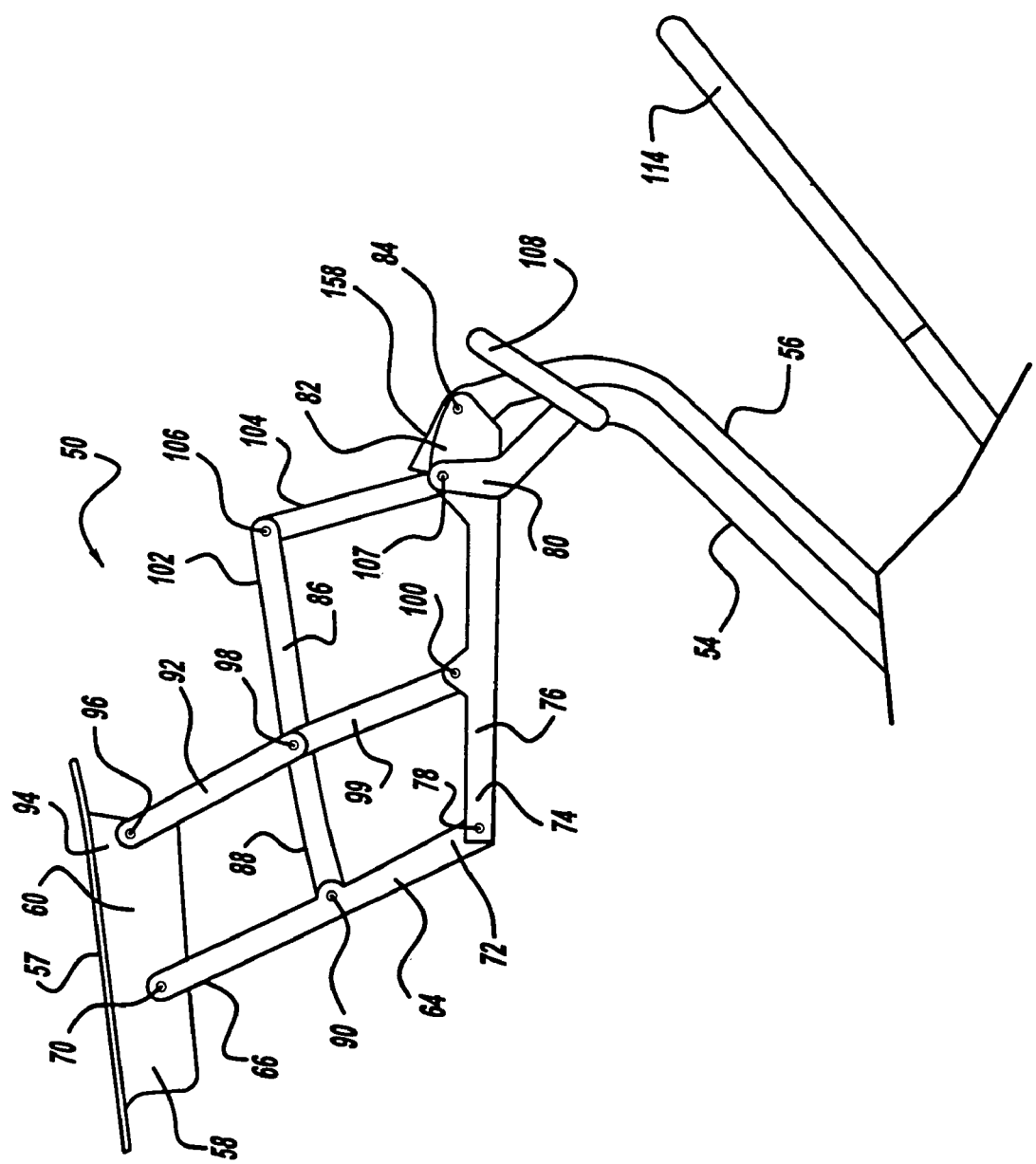
FIG. 9 is a fragmentary, side elevational view showing the linkage mechanism employed in the preferred embodiment automotive convertible roof system, disposed in the partially retracted position.

As can best be observed in FIGS. 4 and 9, each linkage mechanism 50 further includes a forward roof rail 64 having a first end 66 pivotally attached at pivot point 70 to a forward end section 68 of standoff 60. A second end 72 of forward roof rail 64 is pivotally attached at pivot point 78 to a first end 74 of a rear roof rail 76. An aft end section 80 of rear roof rail 76 is pivotally attached to both drive link 54 and balance link 56 at pivot connections 82 and 84, respectively. Pivot connection 82 is positioned forward (towards the front of vehicle 22) of pivot connection 84.

Moreover, linkage mechanism 50 also includes a first actuating link 86 having a first end 88 pivotally attached to a middle section of forward roof rail 64 at pivot connection 90, which is positioned along a length of forward roof rail 64 between pivot points 70 and 78. A control link 92 has one end pivotally attached to an aft section 94 of standoff 60 at pivot point 96, and another end pivotally attached to an intermediate section of actuating link 86 at pivot point 98. A second control link 99 has one end pivotally attached to first actuating link 86 and control link 92 at pivot point 98 and another end pivotally attached to rear roof rail 76 at pivot point 100. Pivot point 100 is positioned along a length of rear roof rail 76 between pivot points 82 and 78. A second end 102 of first actuating link 86 is pivotally attached to one end of a second actuating link 104 at pivot point 106 and another end is pivotally attached to balance link 56 at pivot point 107.

Figure 5:
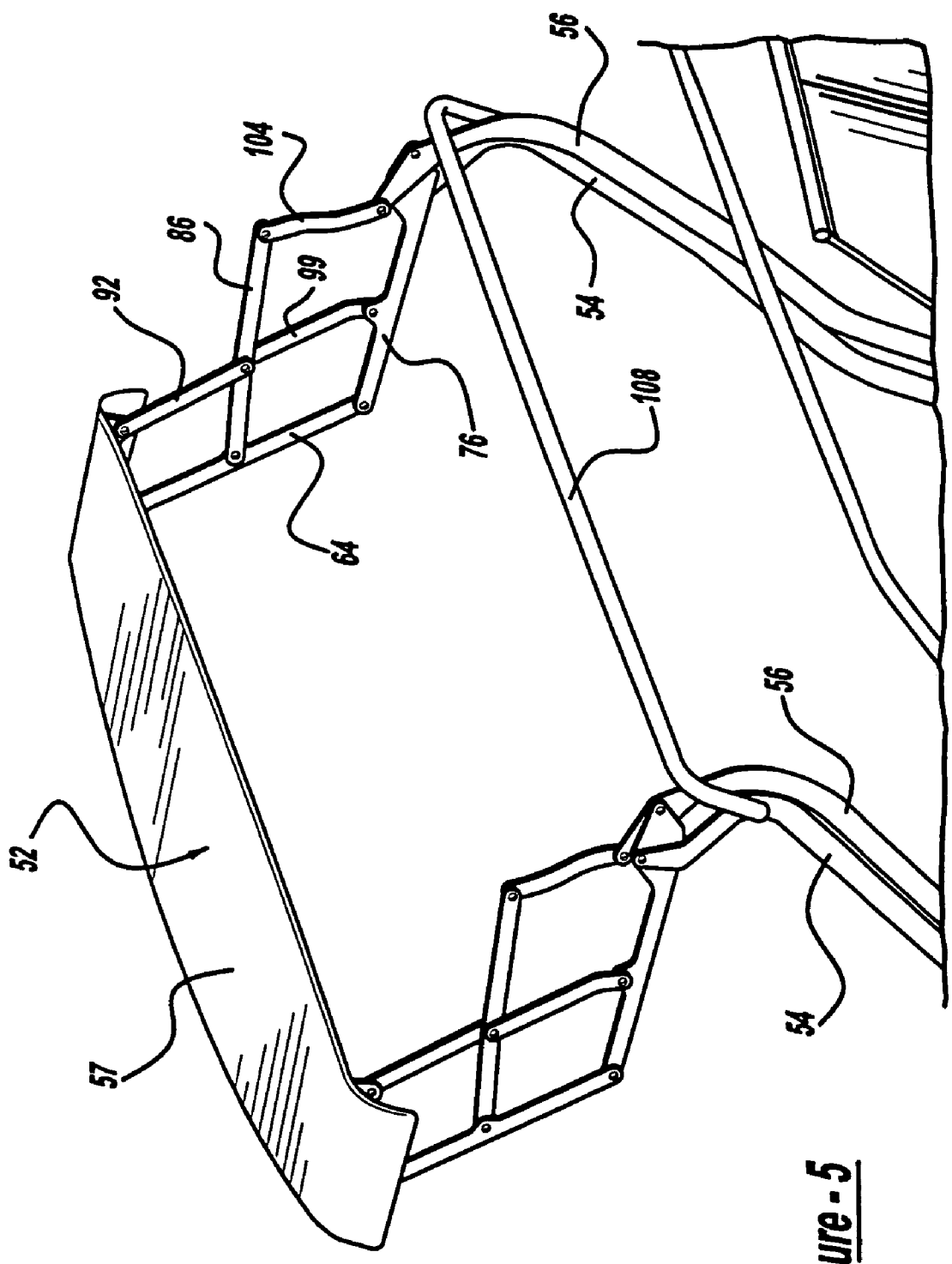
FIG. 5 is a fragmentary, perspective view showing the linkage mechanism employed in the preferred embodiment automotive convertible roof system, disposed in a partially retracted position.
Figure 6:
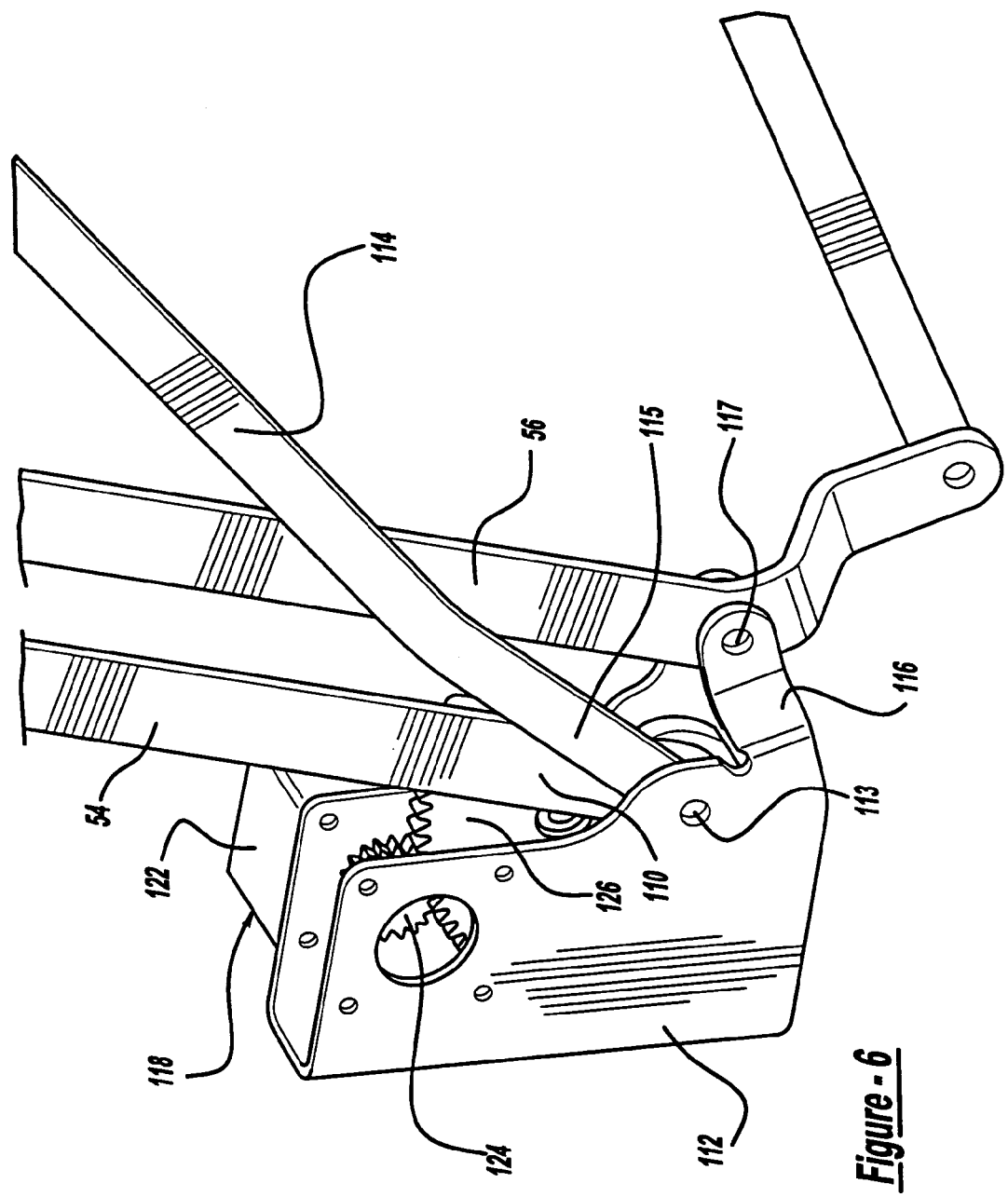
FIG. 6 is a fragmentary, perspective view showing an actuation mechanism employed in the preferred embodiment automotive convertible roof system.
Figure 7:
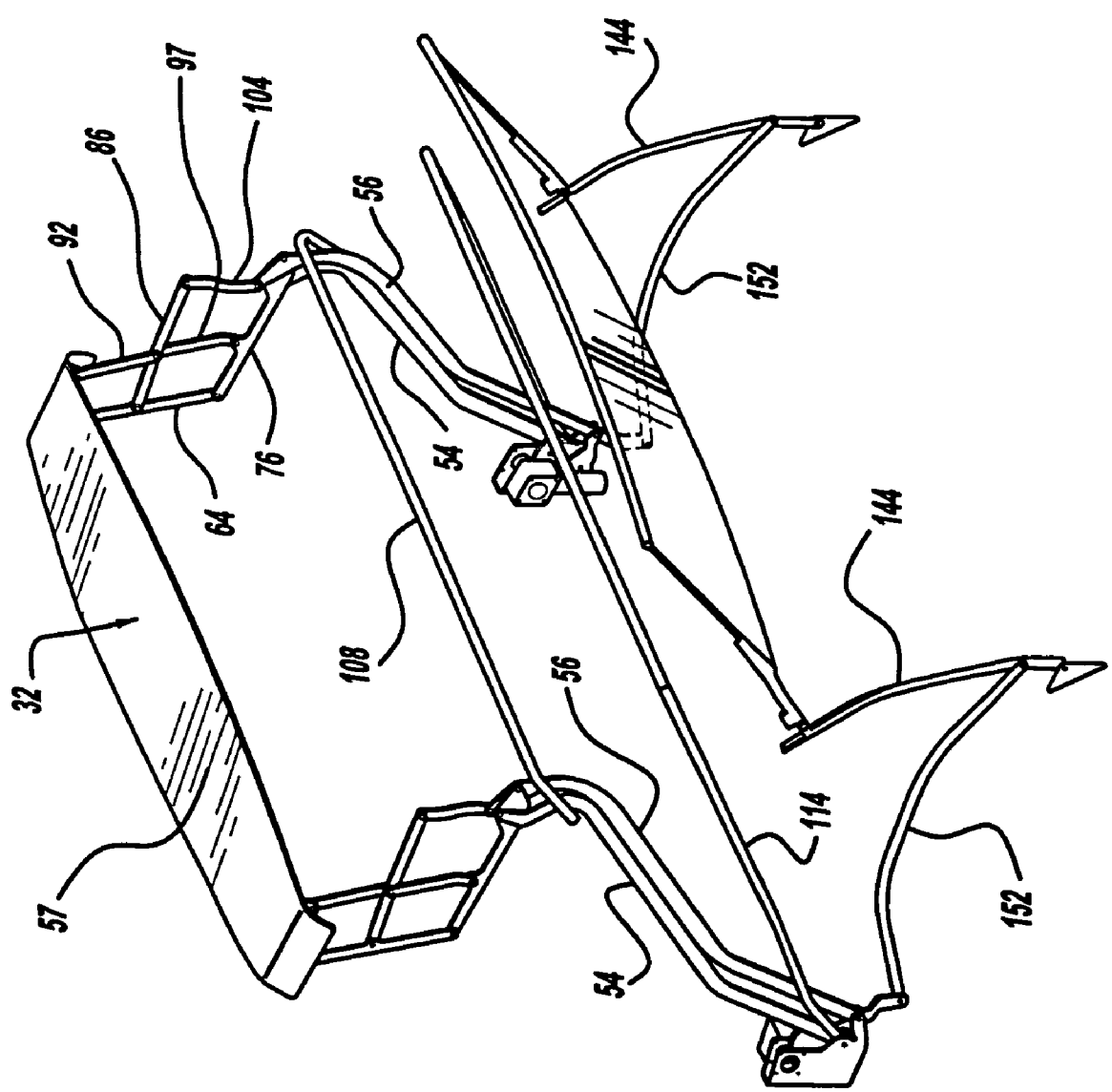
FIG. 7 is a rear perspective view showing the forward top stack and rear backlite linkage mechanism employed in the preferred embodiment automotive convertible roof system, disposed in the partially retracted position.
Figure 8:
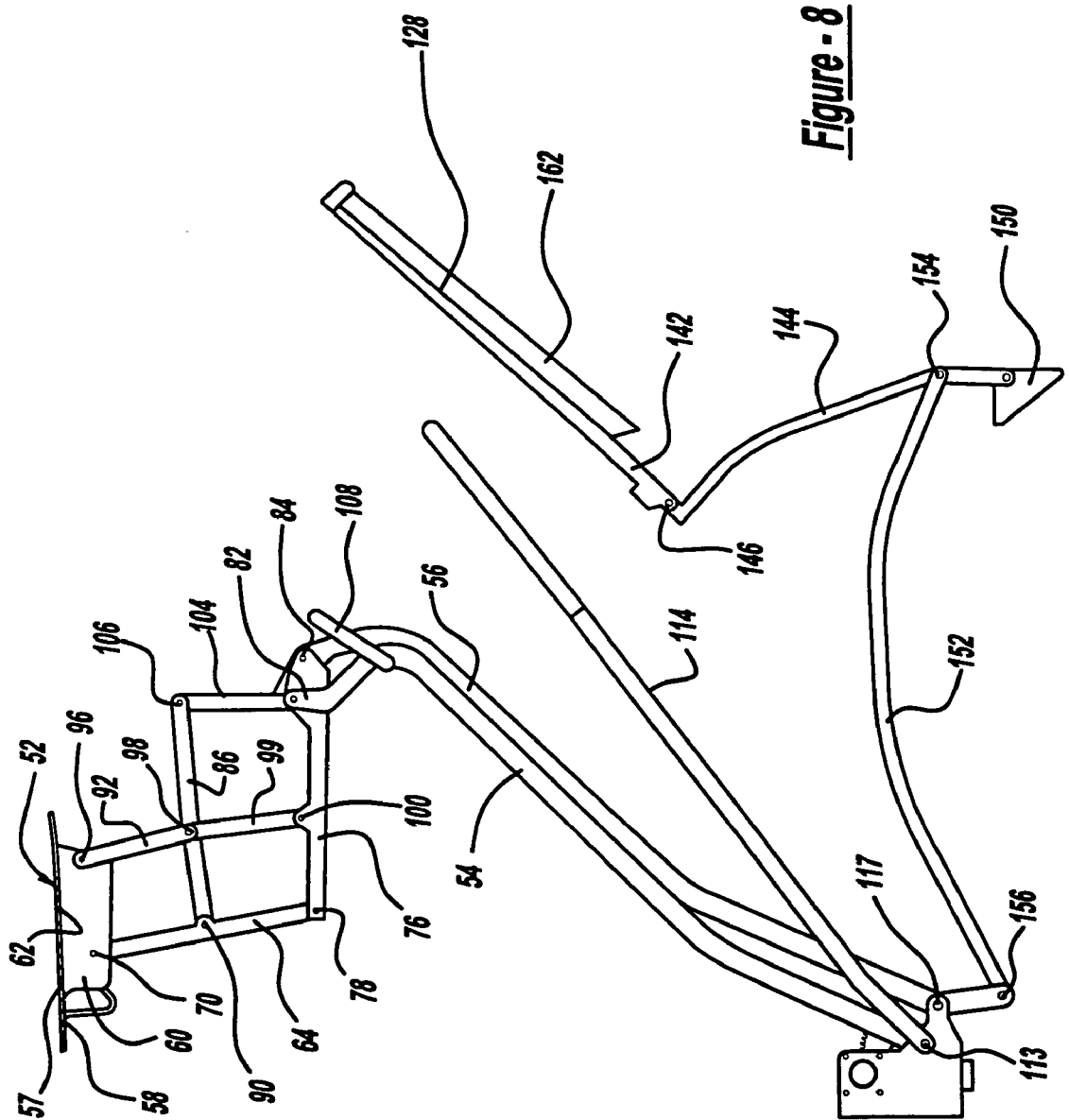
FIG. 8 is a side elevational view of the forward top stack and rear backlite linkage mechanism employed in the preferred embodiment automotive convertible roof system, disposed in the partially retracted position.

Number two roof bow 108 is fixedly attached to drive link 54 by bolting, screwing, welding, or another suitable fastening method. Referring to FIG. 5, drive link 54 has an inner end section 110 pivotally attached to a steel bracket 112 at pivot connection 113. Bracket 112 is preferably bolted to an inner body panel of vehicle 22, although other suitable attaching methods, such as riveting or welding, may also be used. Number three roof bow 114 has an inverted U-shape (see FIG. 3) and includes a pair of end sections 115 that are pivotally attached to bracket 112 utilizing the same pivot connection 113 for attaching drive link 54. Although number three roof bow 114 and drive link 54 utilize a common pivot connection, the two operate substantially independent of one another from a linkage standpoint. Referring to FIGS. 1–6, an outer intermediate section 117, which is oriented in substantially a cross-car direction, is attached within a sewn pocket of cover panel 28. The attachment point determines the angular position of roof bow 114 when the convertible roof is disposed in its fully extended position. Bracket 112 further includes an integral flange 116 to which balance link 56 is pivotally attached at pivot point 117. Alternatively, balance link 56 may be pivotally attached to a fixed member that is separate from bracket 112, or may be attached directly to an inner body panel of vehicle 22.

Convertible roof 20 includes an automatically powered actuation system 118 for operably moving convertible roof 20 between its extended and retracted positions. An actuation system, such as that disclosed in U.S. Pat. No. 5,772,274 entitled "Motorized Drive System For A Convertible Roof Of An Automobile Vehicle," which issued to Tokarz on Jun. 30, 1998, may be employed with the present invention; the forgoing patent is incorporated by reference herein. Actuation system 118 includes a direct current electric motor 120, which supplies the drive force required to operate convertible roof 20. A speed-reducing gearbox 122, which is mounted to a side surface of bracket 112, is coupled to an output shaft (not shown) of electric motor 120. Gearbox 122 employs a series of planetary gear sets (not shown) that function to increase the torque output from electric motor 120. A pinion gear 124 is coupled to an output shaft of gearbox 122 and is meshedly engaged with a sector gear 126 that is pivotally mounted within bracket 112 at pivot point 113. Drive link 54 is directly coupled to sector gear 126 for rotation therewith. Another motorized drive system is disposed and synchronously operated on the opposite side of vehicle 22 in mirrored symmetry with that shown in FIG. 6. Motorized drive system 118 employs a conventional electrical circuit (not shown) for synchronously controlling the operation of electric motor 120.

Backlite linkage mechanism 48 includes a substantially rigid, glass, backlite or back window 128. A U-shaped backlite frame 130 is suitably attached to an upper and two side peripheral edges 132, 134 and 136 respectively, of backlite 128. A number four roof bow 138 is positioned adjacent to a horizontal section of backlite frame 130 to which roof bow 138 is fixedly attached. A trailing edge section 140 of roof panel 28 (see FIG. 1) is attached to number four roof bow 138 while a trailing edge section 141 of side panels 38 are attached to a corresponding side leg of backlite frame 130 so as to produce a weatherproof seal between cover 24 and backlite 128. A lower peripheral edge 143 of backlite 128 adjoins an upper edge 145 of tailgate 36 when convertible roof 20 is in its fully extended position and tailgate 36 is positioned in its closed position, as shown in FIG. 1. It is not preferred to lift up or otherwise pivot forward the backlite or associated rear roof bows during normal convertible roof usage as the storage compartment can be accessed through the tailgate panel.

A pair of backlite frame extensions 142 are fixedly attached to a lower end of each leg of the U-shaped backlite frame, preferably by welding, although various other attachment methods may also be used such as bolts, rivets, or screws. Alternatively, extensions 142 and backlite frame 130 may be constructed as a single component. Backlite frame 130, backlite 128, number four roof bow 138, and backlite frame extensions 142 together form a backlite or back window assembly 143 that functions and always simultaneously moves as a single unit. A pair of backlite control links 144 are hingeably attached to lower end sections of the two backlite frame extensions 142 at pivot point 146. Backlite control link 144 includes an integral backlite actuation stop 146. A boss 148, which protrudes from a forward lower edge of backlite frame extension 142, contacts stop 146 when convertible roof 20 is disposed in its fully extended position, thereby preventing further hinging movement between backlite extension 146 and control link 144. Control link 144 is pivotally attached to a supplemental bracket 150, which in turn is rigidly attached to the inner side body panel of vehicle 22. A pair of backlite drive links 152 have one end pivotally attached to backlite control link 144 at intermediate pivot point 154 and another end pivotally attached to a cantilevered end of balance link 56 at pivot point 156. Coupling drive link 152 to balance link 56 enables coordinated operation of forward top stack linkage mechanism 46 with backlite linkage mechanism 48.

Figure 2:
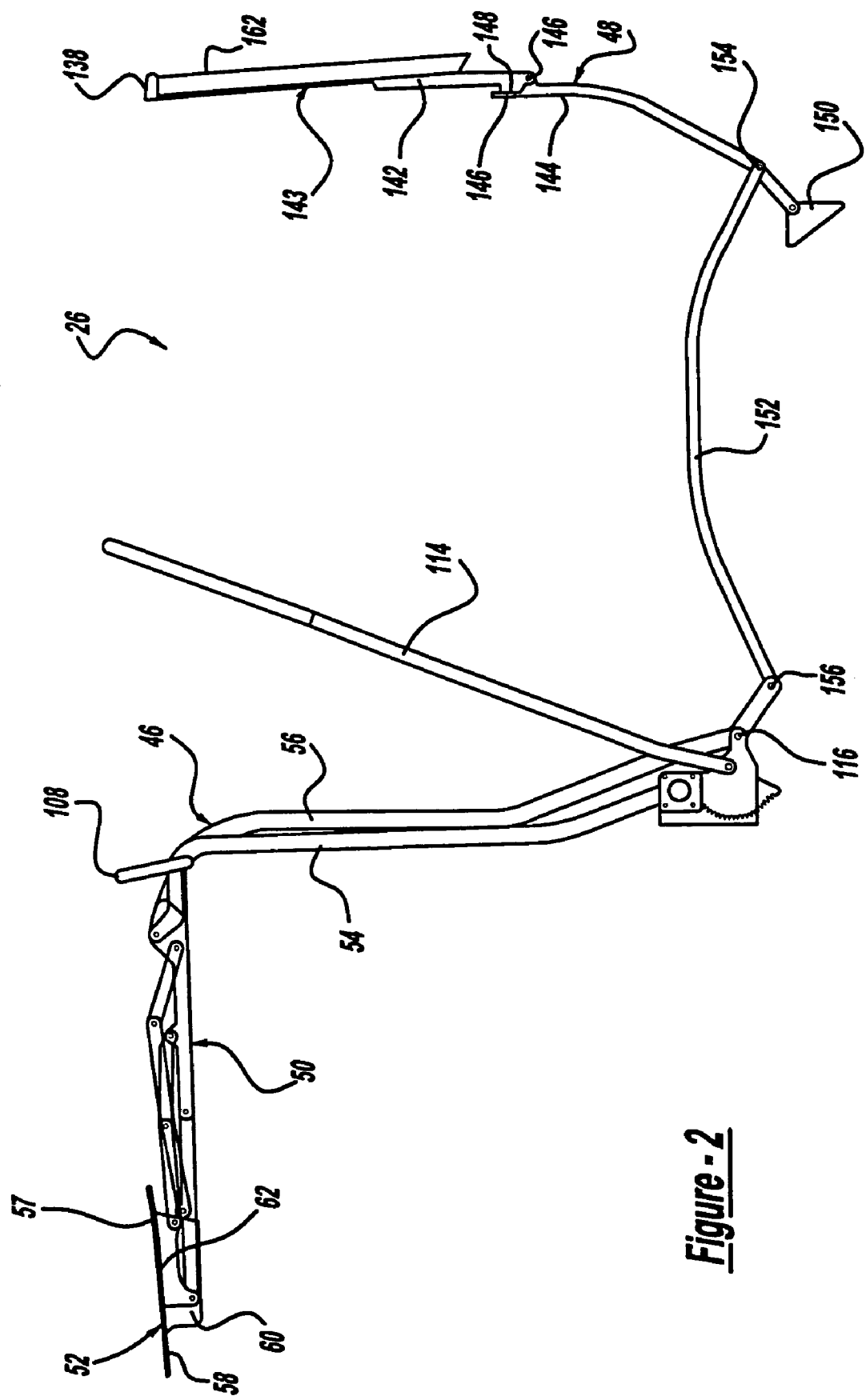
FIG. 2 is a side elevational view of a forward top stack and rear backlite linkage mechanism employed in the preferred embodiment automotive convertible roof system, disposed in the fully extended position.
Figure 3:
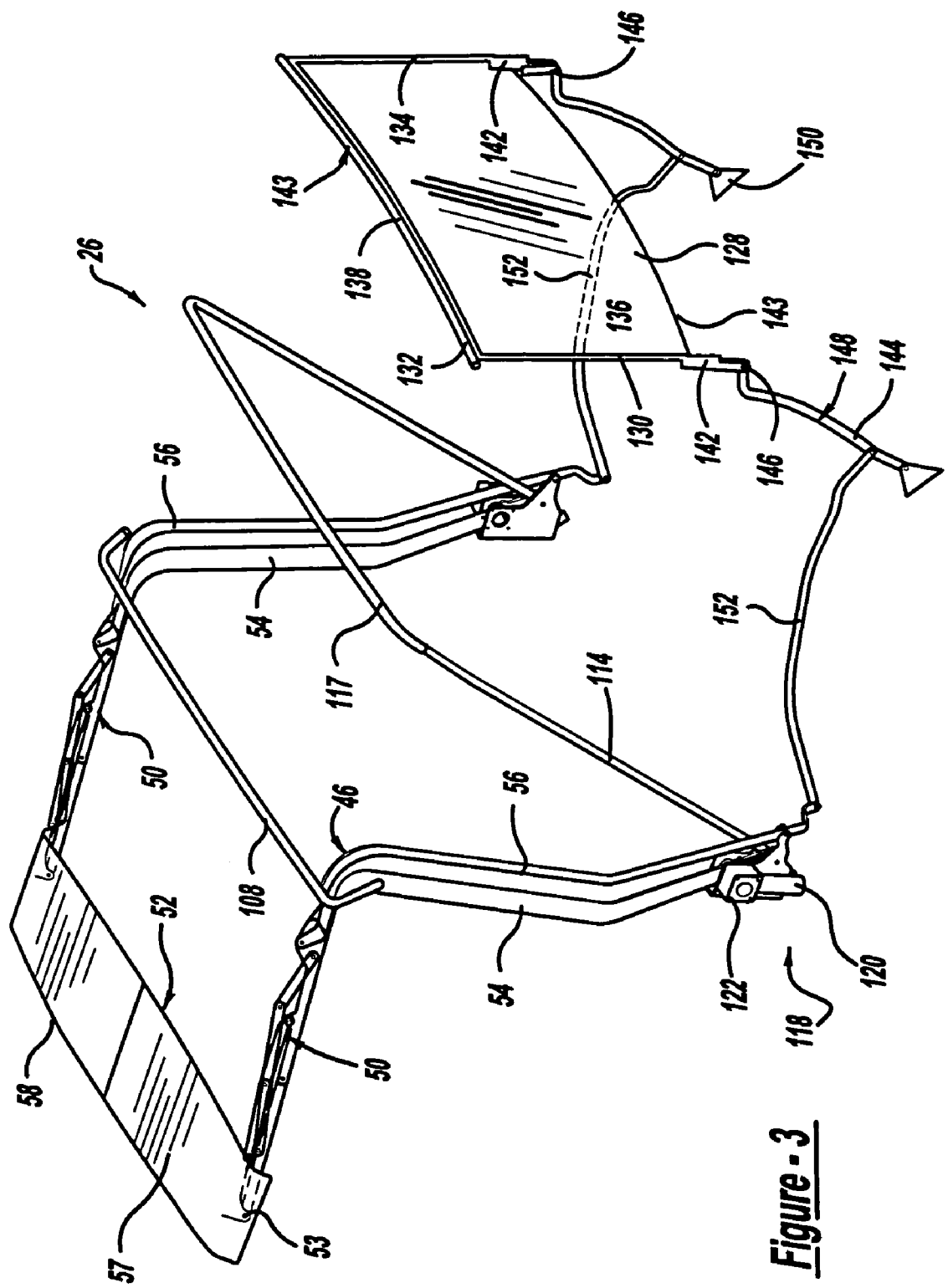
FIG. 3 is a rear perspective view showing the forward top stack and rear backlite linkage mechanism employed in the preferred embodiment automotive convertible roof system, disposed in the fully extended position.
Figure 10:
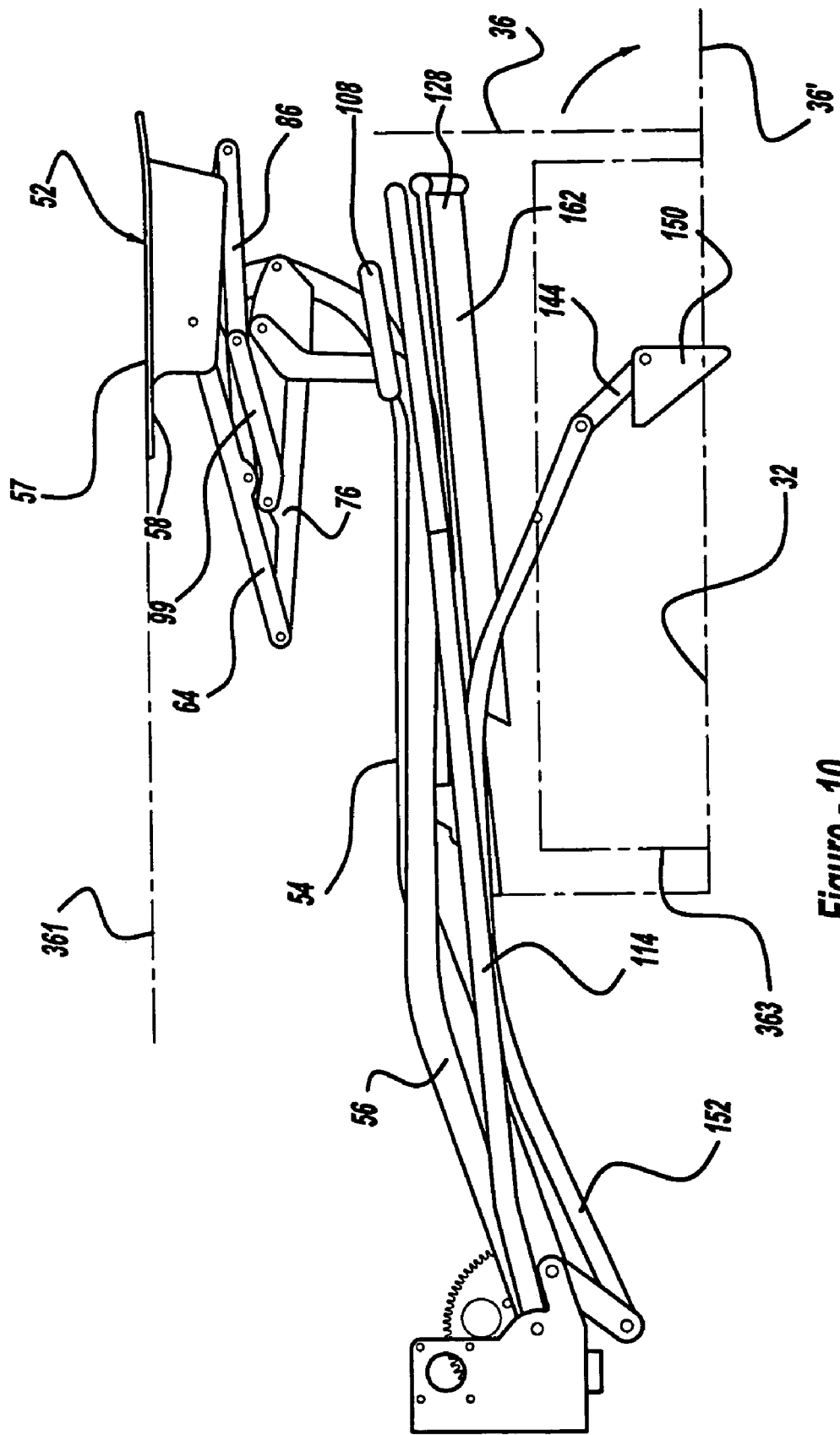
FIG. 10 is a side elevational view showing the forward top stack and rear backlite linkage mechanism employed in the preferred embodiment automotive convertible roof system, disposed in a fully retracted position.
Figure 11:
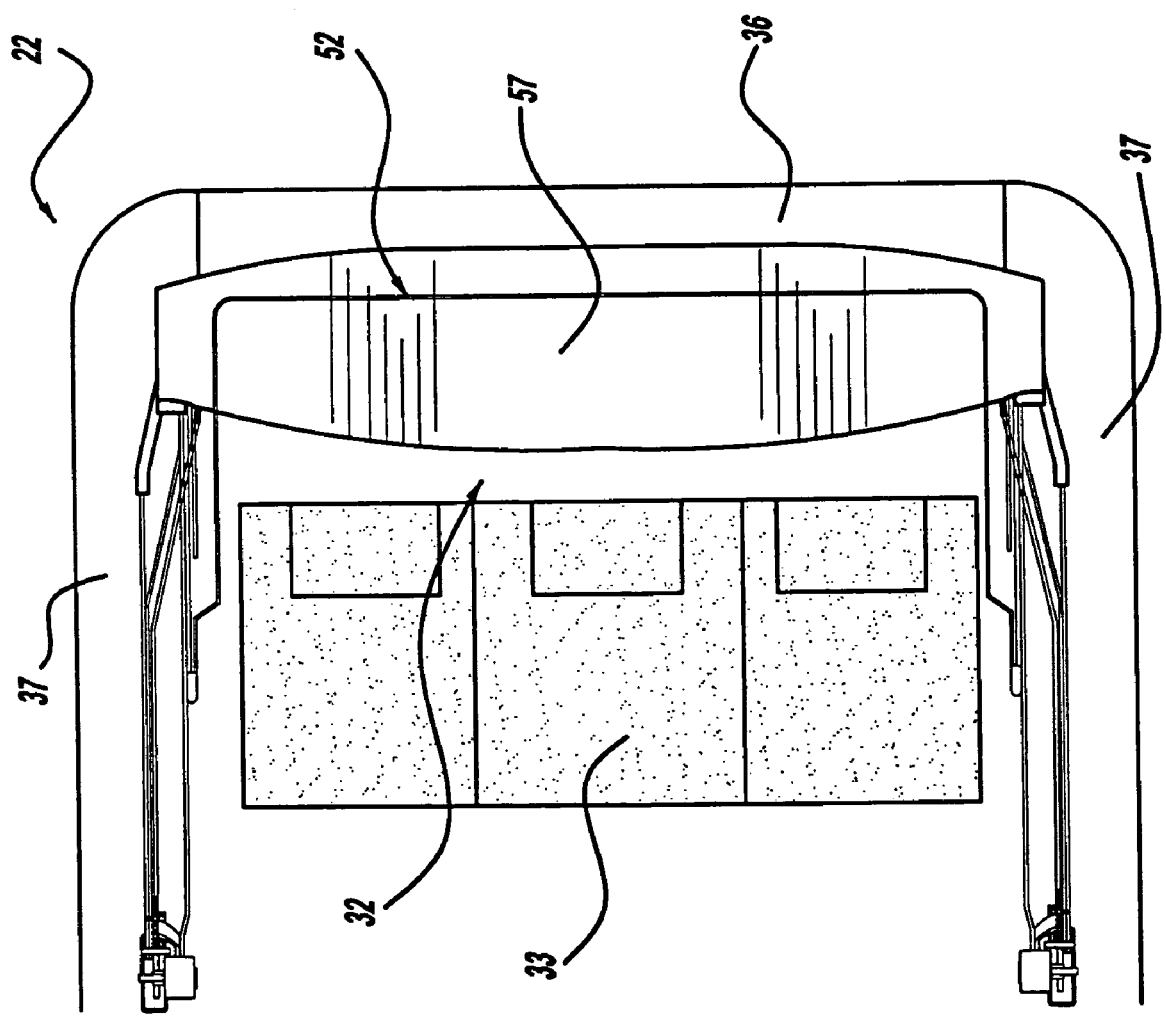
FIG. 11 is a top elevational view showing the forward top stack and rear backlite linkage mechanism employed in the preferred embodiment automotive convertible roof system, disposed in the fully retracted position.

Convertible roof 20 is automatically operable between its extended position (as shown in FIGS. 1–3) and its retracted position (as shown in FIG. 10). To retract the convertible roof, a vehicle operator triggers a switch located within the passenger compartment of the vehicle, which activates electric motor 120. Operating in conjunction with gearbox 122 and pinion gear 124, electric motor 120 causes sector gear 126, and interconnected drive link 54, to rotate about their common pivot connection within bracket 112 in a clockwise direction (as viewed from the left side of vehicle 22). Referring to FIGS. 5 and 7–9, continued movement of drive link 54 causes rear roof rail 76 to rotate in a counterclockwise direction about its pivot connection 84 to balance link 56, while an outer end section of balance link 56 rotates in a clockwise direction about the same pivot connection. Rotating roof rail 76 and the end section of balance link 56 in opposite directions about pivot point 84 causes linkage mechanism 50 to retract number one roof bow 52 in such a manner that the orientation of number one roof bow 52, with respect to vehicle 22, remains relatively unchanged throughout the entire convertible roof operating sequence. As a consequence, upper surface 57 of number one roof bow 52 continues to face upward when convertible roof 20 is disposed in its fully retracted, as shown in FIGS. 10 and 11. Number three roof bow 114, being free to rotate about its pivot connection to bracket 112 due to folding of the attached roof cover, rotates into a nested position with drive link 54 and balance link 56 when convertible roof 20 is fully retracted.

Operation of rear backlite linkage mechanism 48 is synchronized with the operation of front top stack linkage mechanism 46. Actuating electric motor 120 to move convertible roof 20 from its extended to its retracted position automatically and simultaneously causes balance link 56 to rotate in a clockwise direction (as illustrated) about its pivot connection 117 with bracket 116. This causes backlite drive link 152 to be pulled in a generally forward direction (towards the front of the vehicle), which in turn rotates backlite control link 144 in a counterclockwise direction about its pivot connection with bracket 150. This causes backlite assembly 143 to collapse in such a manner that an outward facing surface 162 of backlite 128 is positioned so as to face in a downward direction when the convertible roof is disposed in its fully retracted position, as shown in FIG. 10. Convertible roof 20 is returned to its fully extended and raised position by simply repeating, in reverse order, the previously disclosed steps for retracting the convertible roof.

Referring to FIGS. 1, 10 and 11, with convertible roof 20 in its fully retracted position, surface 160 of number one roof bow 52, and the portion of the cover thereon, are substantially aligned flush and co-planar with a horizontal beltline 361 of vehicle 22. Rear storage space 32, part of which is located under the retracted convertible roof, can be accessed from the rear of the vehicle by opening rear tailgate 36 and luggage or other miscellaneous objects 363 can be removably stored therein even with the roof retracted and without having to manually disturb the roof. Rear storage space 32 may also be accessible from the passenger compartment if the second or third row of forward facing seats 33 contain a pass through feature or can be folded down. Number one roof bow 52 covers a substantial portion of the vehicle's rear storage space, thereby providing additional security and protection for items stored in the storage compartment below the fully retracted convertible roof while significantly enhancing the appearance and retracted aerodynamics.

FIGS. 12–15 show an alternate configuration 46A of the forward top stack linkage mechanism of the present invention. Alternate top stack linkage mechanism 46A includes a number one roof bow 166 that is rigidly attached to a pair of front roof rails 168. Each front roof rail 168 is hingeably coupled to an adjacent rear roof rail 170 at a pivot point 172. A multi-link hinge 174, consisting of two links 175 and 177, has one end pivotally attached to front roof rail 168 at pivot point 176, and another end pivotally attached to rear roof rail 170 at pivot point 178. A control link 180 has one end pivotally connected to multi-link hinge 174 at pivot point 182, and another end connected to an outer end section 184 of a drive link 186. Rear roof rail 168 is pivotally connected to drive link 186 and a balance link 188 at pivot connections 190 and 192, respectively. A number two roof bow 194 has a pair of ends that are fixedly attached to a pair of mounting brackets 196 by welding, or any other suitable attaching method. Mounting bracket 196 is rigidly attached to an outer end of drive link 186.

Figure 15:
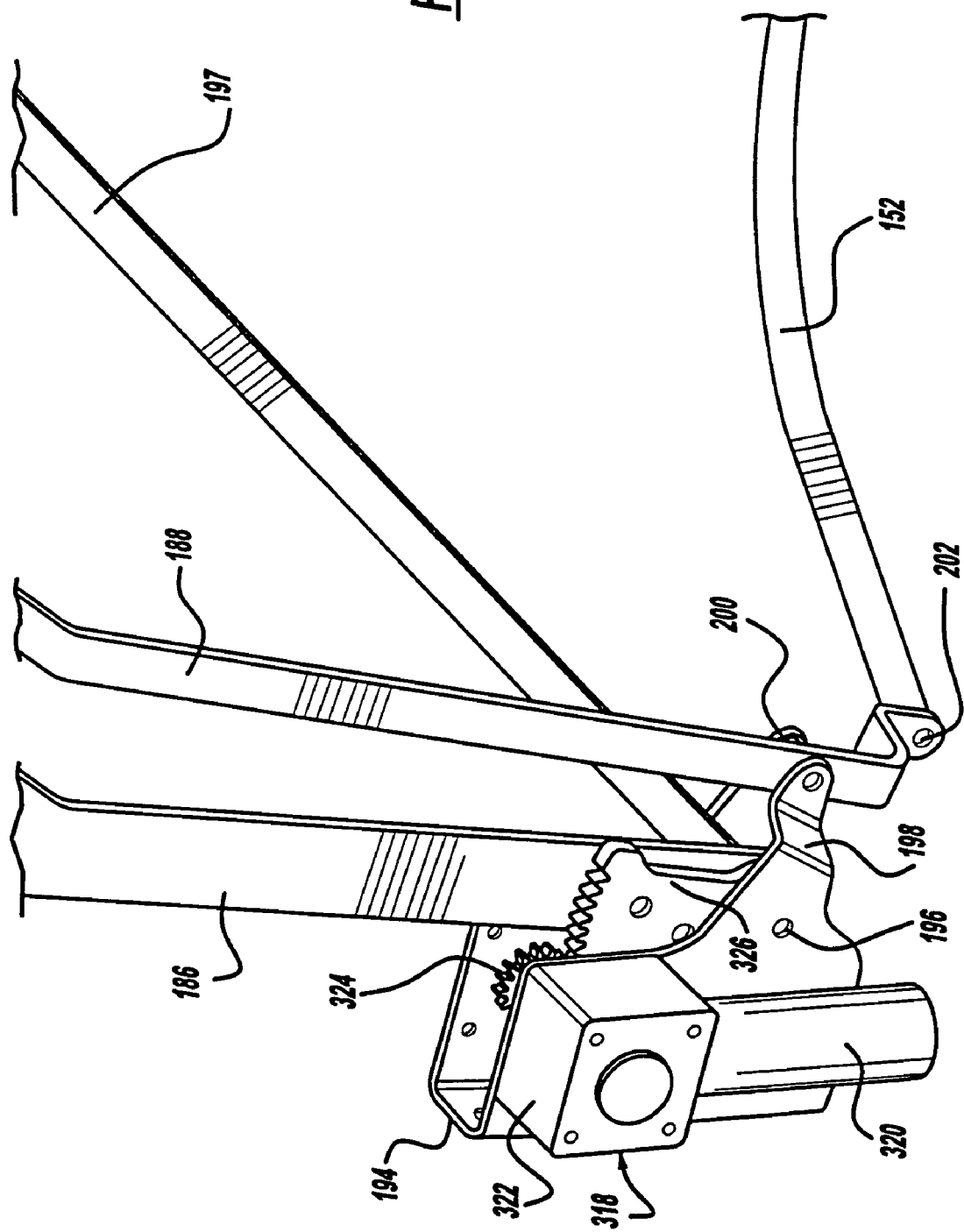
FIG. 15 is a fragmentary, perspective view of an actuation mechanism employed in the alternate embodiment automotive convertible roof system.
Figure 16:
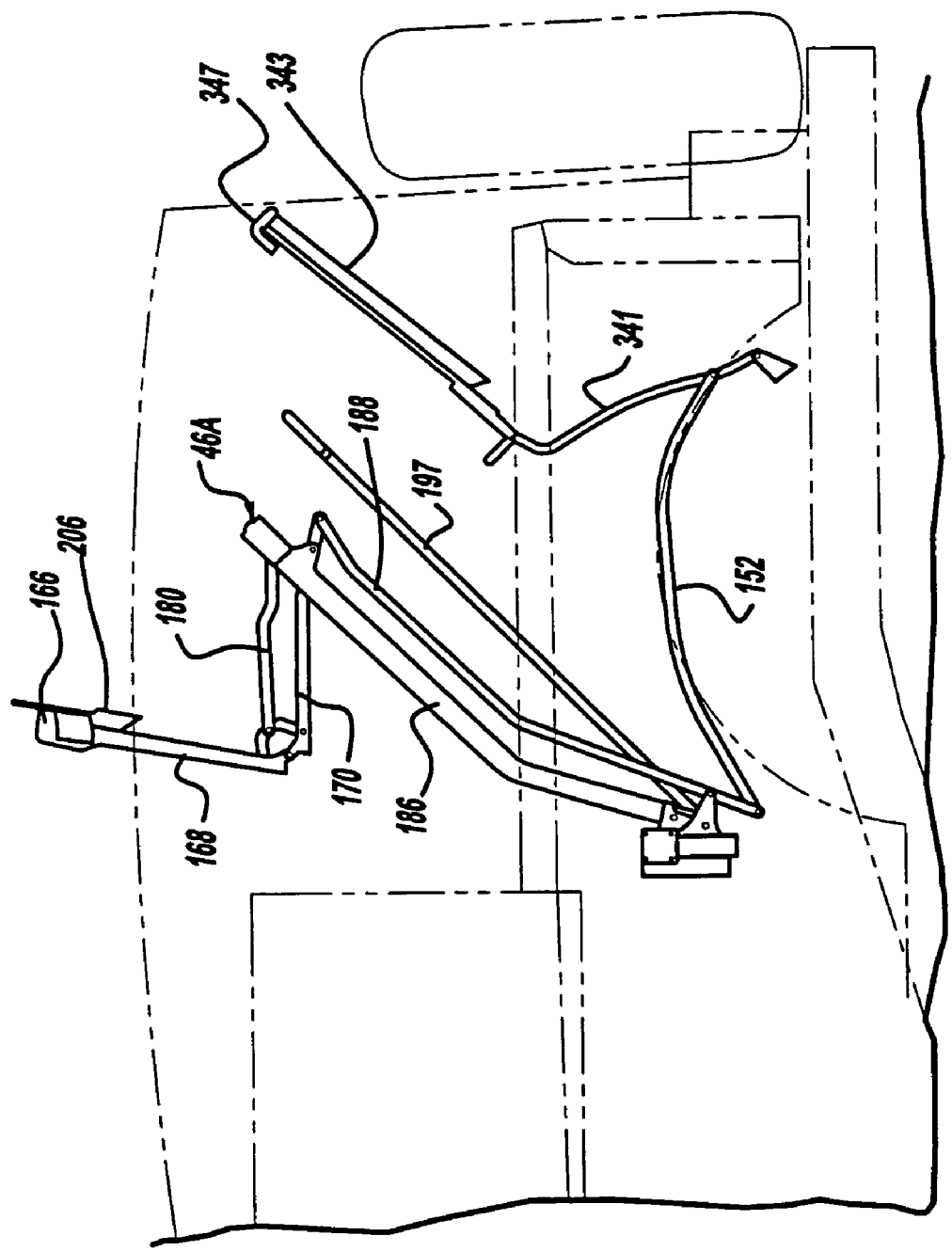
FIG. 16 is a side elevational view of the forward top stack and rear backlite linkage mechanism employed in the alternate embodiment automotive convertible roof system, disposed in a partially retracted position.
Figure 17:
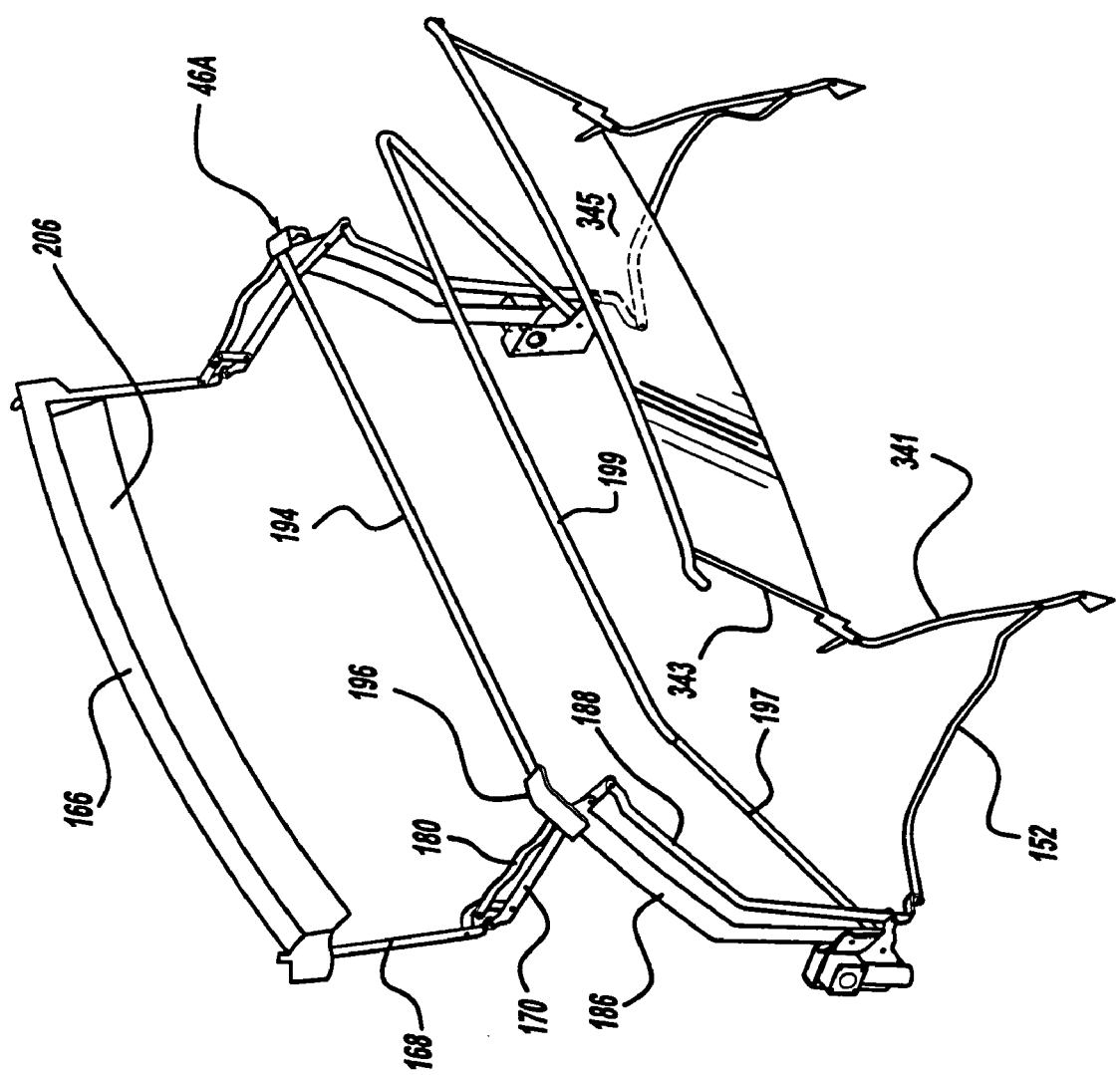
FIG. 17 is a rear perspective view of the forward top stack and rear backlite linkage mechanism employed in the alternate embodiment automotive convertible roof system, disposed in the partially retracted position.
Figure 18:
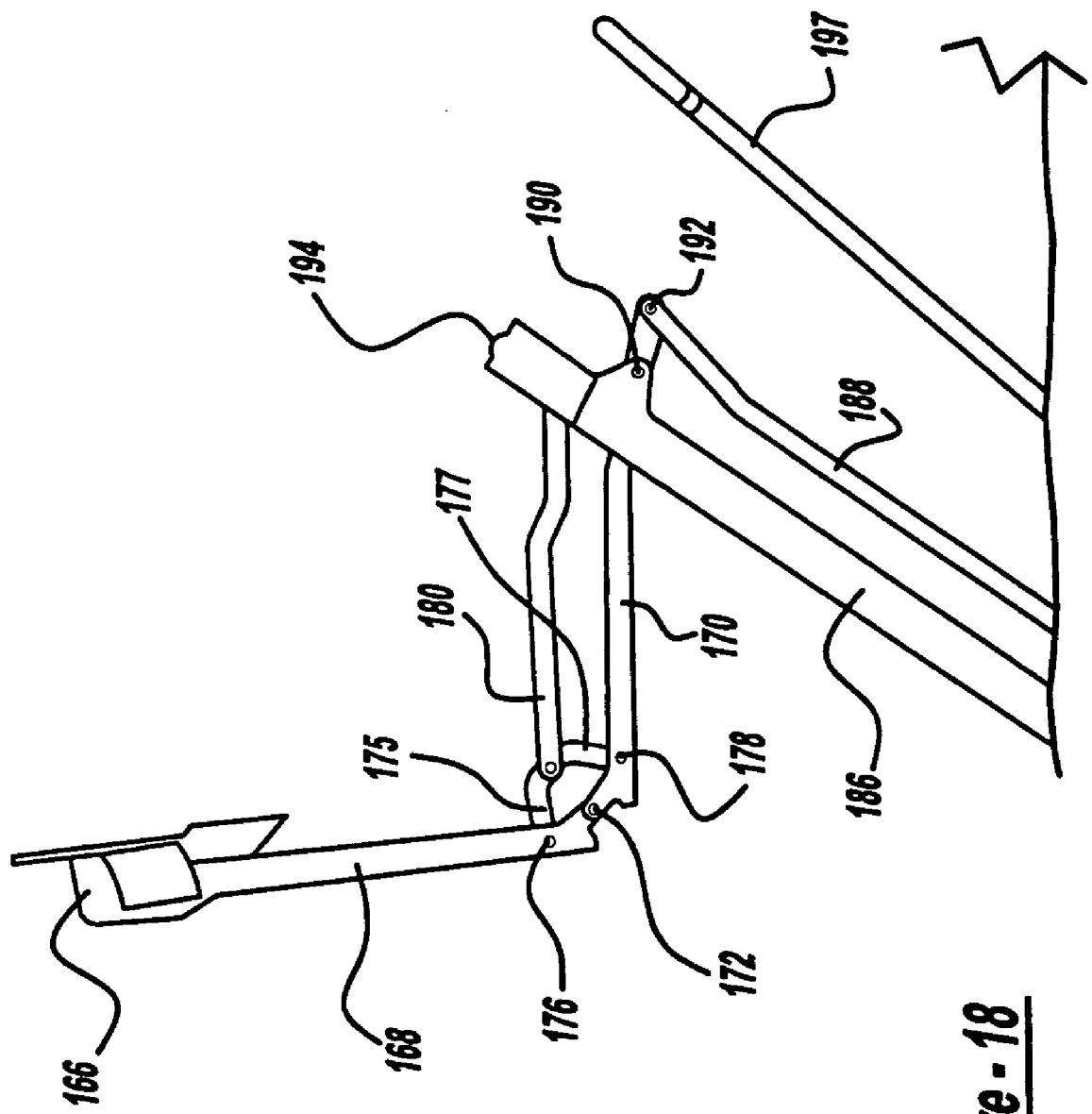
FIG. 18 is a fragmentary, side view of the forward top stack linkage mechanism employed in the alternate embodiment automotive convertible roof system, disposed in the partially retracted position.

Reference should now be made to FIGS. 15 and 16. Motorized drive system 318 is employed for automatically cycling top stack linkage mechanism 46A between its extended and retracted positions. A speed-reducing gearbox 322 is coupled to an output shaft (not shown) of electric motor 320. Gearbox 322 is fixedly attached to a bracket 194. A pinion gear 324 is coupled to an output shaft (not shown) of gearbox 322 and is meshedly engaged with sector gear 326. Sector gear 326 is pivotally mounted within bracket 194 at pivot point 196. Drive link 186 is directly coupled to sector gear 326 for rotation therewith. Another motorized drive system is disposed and synchronously operated on the opposite side of vehicle 22 in mirrored symmetry with that shown in FIG. 15. Motorized drive system 318 employs a conventional electrical circuit for controlling the operation of electric motor 320. Bracket 194 includes an integral flange 198 that extends from a rear section of bracket 194 to which balance link 188 is pivotally attached at pivot point 200. Balance link 188 is pivotally attached to rear backlite drive link 152 at pivot point 202. Rear backlite drive link 152 is coupled to a backlite control link 341, which is coupled to a backlite frame 343, backlite 345, and number four roof bow 347. An inverted U-shaped number three roof bow 197 has a pair of end sections that are pivotally attached to bracket 194 utilizing the same pivot connection 196 for attaching drive link 186 to the bracket. Although number three roof bow 197 and drive link 186 utilize a common pivot connection, the two operate mechanically independent of one another from a linkage standpoint. An outer intermediate section 199, which is oriented in substantially a cross-car direction, is suitably attached to panel 28 (see FIG. 1) of cover 24. The attachment point determines the angular position of roof bow 197 when the convertible roof is disposed in its fully extended position.

Figure 12:
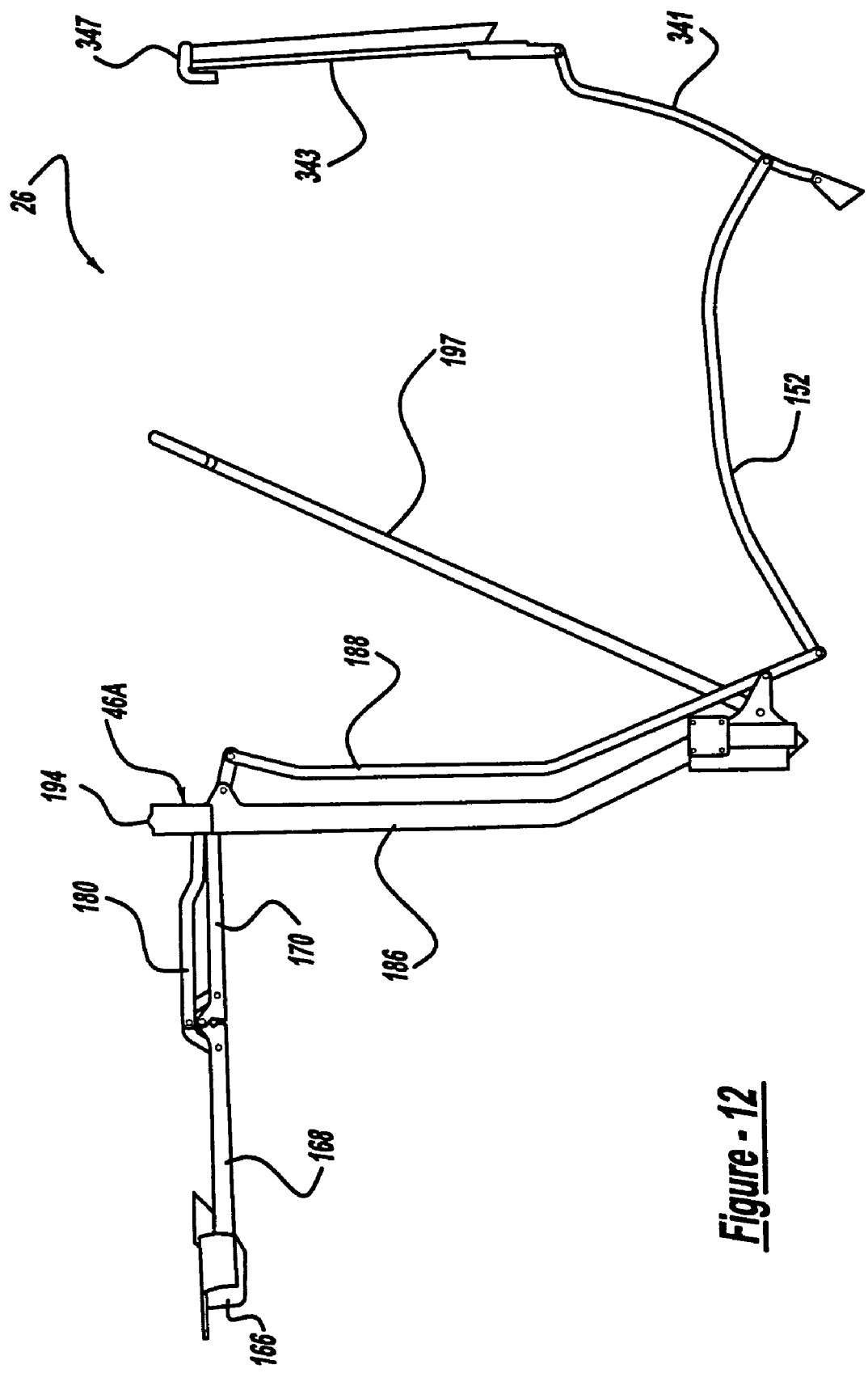
FIG. 12 is a side elevational view showing a forward top stack and rear backlite linkage mechanism employed in an alternate embodiment automotive convertible roof system, disposed in a fully extended position.
Figure 13:
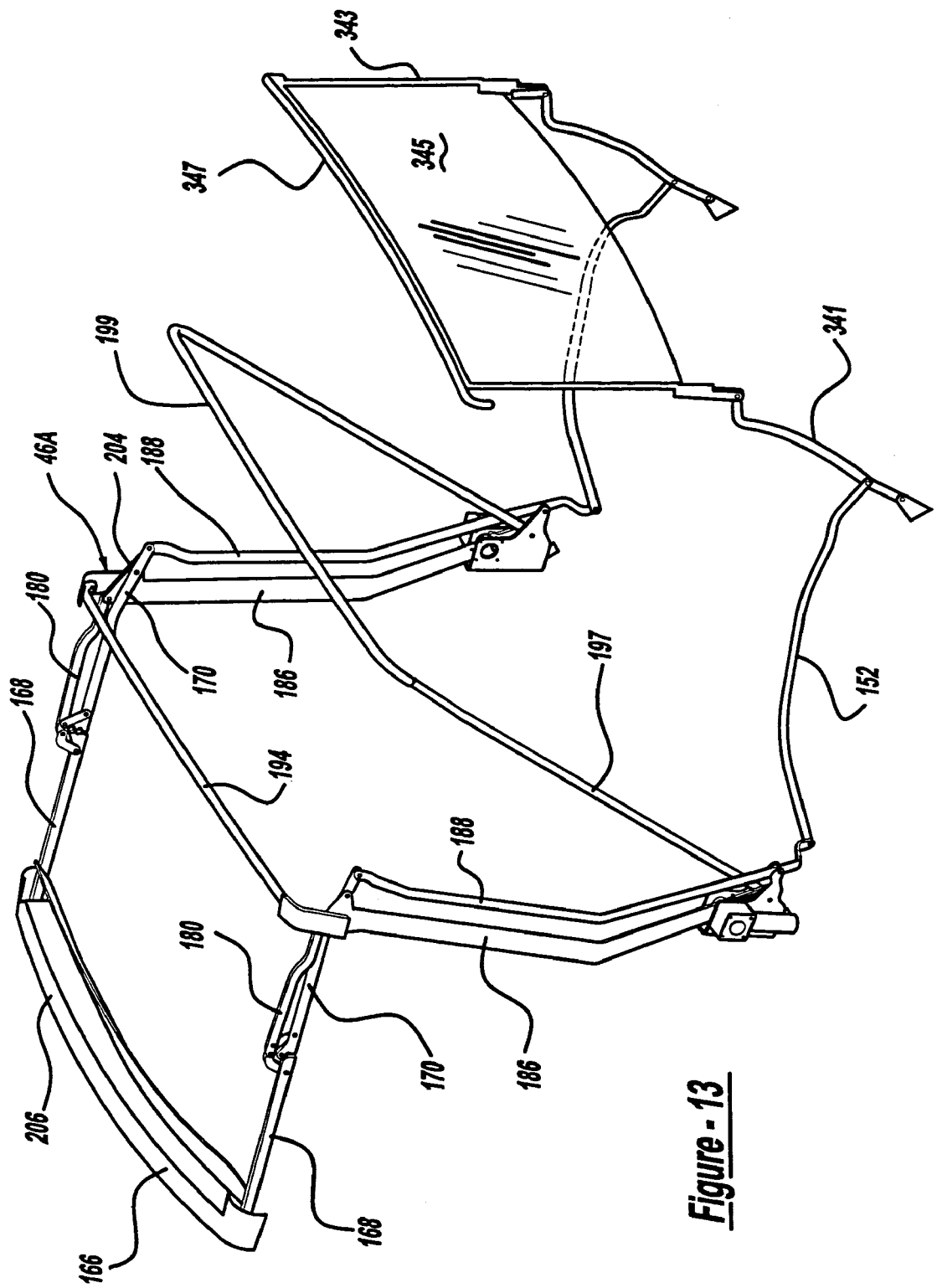
FIG. 13 is a rear perspective view showing the forward top stack and rear backlite linkage mechanism employed in the alternate embodiment automotive convertible roof system, disposed in the fully extended position.
Figure 14:
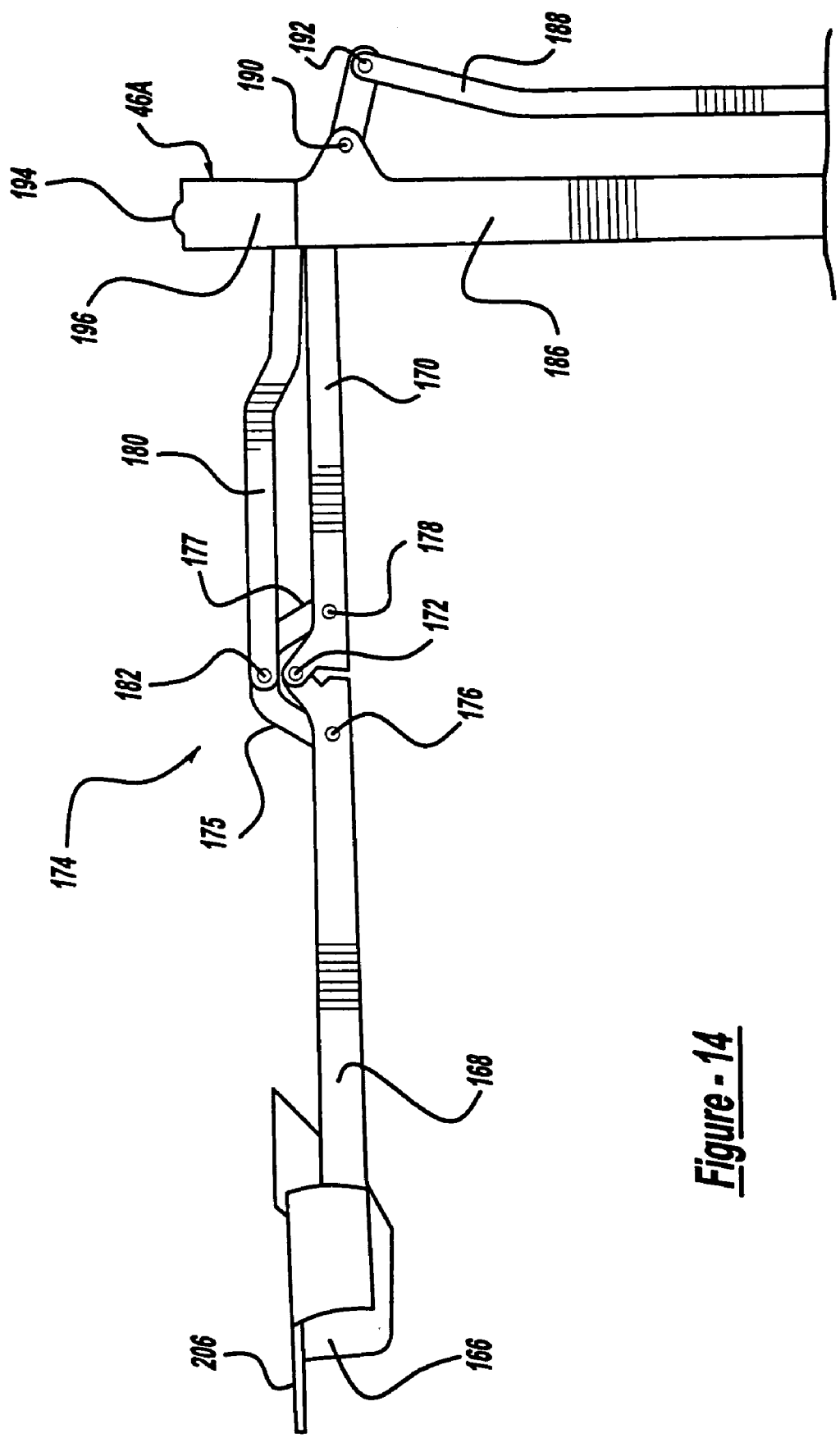
FIG. 14 is a fragmentary side elevational view of the forward top stack linkage mechanism employed in the alternate embodiment automotive convertible roof system, disposed in the fully extended position.
Figure 19:
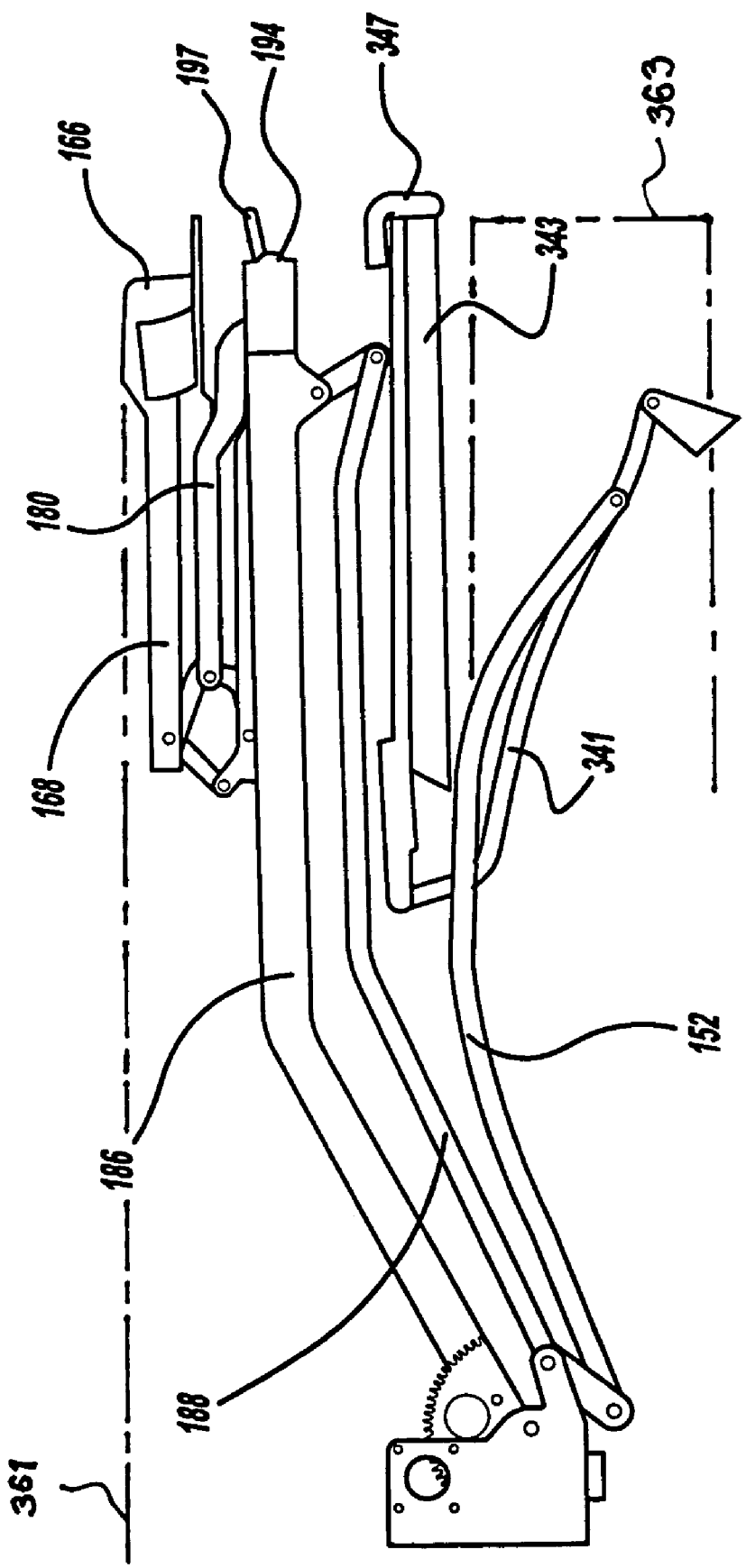
FIG. 19 is a side elevational view of the forward top stack and rear backlite linkage mechanism employed in the alternate embodiment automotive convertible roof system, disposed in the fully retracted position.

Forward top stack linkage mechanism 46A is operable between an extended position (as shown in FIGS. 12 and 13) and a retracted position (as shown in FIG. 19). To retract top stack linkage mechanism 46A, an operator triggers a switch located within the passenger compartment of the vehicle, which activates electric motors 320. Operating in conjunction with gearbox 322 and pinion gear 324, electric motor 320 cause sector gear 326, and interconnected drive link 186, to rotate about pivot point 196 in a clockwise direction (as viewed from the left side of vehicle 22). Referring to FIGS. 16–19, continued movement of drive link 186 causes rear roof rail 170 to rotate in a counterclockwise direction about pivot connection 190, while an outer end section 204 of drive link 186 rotates in a clockwise direction about the same pivot connection. Rotating roof rail 170 and drive link section 204 in opposite directions about pivot point 190 causes control link 180 to be pulled in a generally aft direction relative to roof rail 170, which causes forward roof rail 168 to pivot in a clockwise direction about its pivot connection 172 to rear roof rail 170. With top stack linkage mechanism 46A disposed in its fully retracted position, a surface 206 of number one roof bow 166 (which faces upward when linkage mechanism 46A is disposed in its fully extended position) is caused to face downward when top stack linkage mechanism 46A is fully retracted, as shown in FIG. 19. Number three roof bow 197, being free to rotate about its pivot connection to housing 194, rotates into a nested position with drive link 186 and balance link 184 when convertible roof 20 is fully retracted. Forward top stack linkage 46A is returned to its fully extended position by simply repeating, in reverse order, the previously disclosed steps for retracting the forward top stack linkage mechanism.

While various aspects of the convertible roof system have been disclosed, it will be appreciated that many other variations may be incorporated without departing from the scope of the present invention. For example, a hydraulically driven actuation mechanism may be used in place of the disclosed motorized drive mechanism that is used to drive the forward top stack linkage mechanism. Furthermore, a single link may be substituted in place of the first and second control links that are included as part of the reverse tri-fold linkage mechanism. Additionally, although not preferable, the electric motor may drive intermediate cables, rack and pinion assemblies, chains, belts or other mechanical coupling devices in combination with certain aspects of this invention. Likewise, various materials and linkages have been disclosed in an exemplary fashion, however other materials and linkages having differing shapes may of course be employed. Combinations of hard-top and soft-top sections can also be utilized. The description of the invention is merely exemplary in nature and, thus, variations that do not depart from the gist of the invention are intended to be within the scope of the invention. It is intended by the following claims to cover these and any other departures from the disclosed embodiments that fall within the true spirit of the invention.

What is claimed is:

1. An automotive convertible roof, top stack linkage mechanism comprising:
   a forwardmost roof bow having a surface that faces upwardly when in its fully extended position;
   a balance link;
   a first roof rail having a first end pivotally attached to the balance link;
   a second roof rail having a first end pivotally attached to a second end of the first roof rail and a second end pivotally attached to the roof bow;
   a first actuating link having one end pivotally attached to the second roof rail;
   a first control link having one end pivotally attached to the roof bow and another end pivotally attached to the first actuating link;
   a second control link having one end pivotally attached to the first roof rail and another end pivotally attached to the first actuating link; and a second actuating link having an end pivotally attached to a second end of the first actuating link and another end pivotally attached to the balance link;

wherein the upper surface of the forwardmost roof bow continues to face upwardly when in its fully retracted position.

2. The top stack linkage mechanism of claim 1, further comprising a drive link having a first end section pivotally attached to the first roof rail and a second end section pivotally attached to a second pivot point.

3. The top stack linkage mechanism of claim 2, further comprising an automatic actuator connected to the drive link operably rotating the drive link between a first position, wherein the top stack linkage mechanism is positioned in its extended position, and a second position wherein the top stack linkage mechanism is positioned in its retracted position.

4. The top stack linkage mechanism of claim 3, wherein the automatic actuator is comprised of:
a sector gear coupled to the second end section of the drive link; and
an electric motor operably driving the sector gear.

5. The top stack linkage mechanism of claim 2, further comprising a second roof bow having an end fixedly attached to the drive link.

6. The top stack linkage mechanism of claim 1, further comprising another roof bow having an end pivotally attached to the second pivot point.

7. The top stack linkage mechanism of claim 5, wherein the other roof bow has a substantially inverted U-shape with a cross-car leg spanning between side legs, the side legs being elongated at least two-thirds as much as the cross-car leg.

8. The top stack linkage mechanism of claim 1, wherein an intermediate section of the balance link is pivotally attached to a first pivot point.

9. The top stack linkage mechanism of claim 1, further comprising:
a soft-top cover covering the roof bow; and
a rigid back window attached to the cover and retracting with at least one of the roof rails;
the back window being fully retracted to a substantially horizontal orientation substantially parallel to the upper surface of the forwardmost roof bow when it is fully retracted.

10. An automotive convertible roof, folding mechanism comprising:
a drive link pivotally attached to a first pivot point;
a balance link pivotally attached to a second pivot point;
a supplemental link pivotally attaching the drive link to the balance link;
a back window control link pivotally attached to a third pivot point; and
a back window drive link having one end section pivotally coupled to the balance link and another end section pivotally coupled to the back window control link.

11. The mechanism of claim 10, further comprising a back window peripherally attached to a frame having a substantially inverted U-shape, a leg of the frame being pivotally attached to the back window control link.

12. The mechanism of claim 11, wherein the back window frame rotates about its pivot connection with the back window control link in a direction that is opposite to the direction that the back window control link rotates about the third pivot point when moved between its extended and retracted positions.

13. The mechanism of claim 10, further comprising a rigid back window having an exterior surface that is rearwardly facing when in its extended position, and the exterior surface of the back window facing in a substantially downward direction when in its retracted position.

14. The mechanism of claim 10, further comprising a rigid back window positioned substantially below a substantially horizontal and cross-vehicle plane defined by the back window drive link, when retracted.

15. The mechanism of claim 10, further comprising:
a soft-top cover covering the links and having a front section that is upwardly facing when in both its fully extended and fully retracted positions; and
a rigid back window positioned adjacent a void in the cover;
the back window being fully retracted to a substantially horizontal orientation below the front section of the cover.

16. The mechanism of claim 10, wherein the back window drive link rotates about the first pivot point in a direction that is opposite to the direction that the back window control link rotates about the third pivot point when the linkage mechanism is moved between its extended and retracted positions.

17. A convertible roof comprising:
a drive link;
a balance link;
a first roof rail pivotally attached to the balance link and the drive link;
a second roof rail coupled to the first roof rail;
a scissor linkage mechanism having at least two links pivotally attached to one another, with an end of one link pivotally attached to the second roof rail and an end of the other link pivotally attached to the first roof rail; and
a control link pivotally attached to the drive link and the scissor linkage mechanism.

18. The roof of claim 17, further comprising a first roof bow fixedly attached to a first end section of the second roof rail.

19. The roof of claim 18, further comprising a second roof bow having an end section fixedly attached to the drive link.

20. The roof of claim 19, further comprising a third roof bow having an end section pivotally attached to the drive link.

21. The roof of claim 20, wherein the third roof bow has a substantially inverted U-shape with downwardly extending legs and a cross-car middle section spanning between the legs, and the legs are substantially as long as the cross-car middle section.

22. The roof of claim 17, further comprising:
a soft-top cover covering the links and having a front section that is upwardly facing when in both its fully extended and fully retracted positions; and
a rigid back window positioned adjacent a void in the cover;
the back window being fully retractable to a substantially horizontal orientation below the front section of the cover.

23. The roof of claim 17, further comprising:
a sector gear coupled to the drive link; and
an electric motor operably driving the sector gear.

24. The roof of claim 17, further comprising a retractable and rigid back window and a roof bow mounted above the back window when raised, the back window and the roof bow always moving together.

25. An automotive vehicle comprising:
- a vehicle body having a windshield header and a substantially vertical and rearmost body panel, the body further having a passenger compartment and a storage compartment, the storage compartment being accessible from and being rearward of the passenger compartment;
- a tailgate movably coupled to the vehicle body to allow access to the storage compartment regardless of the position of the roof, the storage compartment being operable to hold miscellaneous and even non-roof objects;
- a convertible roof covering the passenger and storage compartments, and extending essentially from the windshield header to the rearmost body panel when in a raised position; and
- a forwardmost roof bow attached to the roof, the roof bow having an upper surface that remains upwardly facing when in both its raised and retracted positions.

26. The vehicle of claim 25, wherein the storage compartment operably receives the roof when in its retracted position, and the vehicle is a sport utility vehicle.

27. The vehicle of claim 25, wherein the portion of the roof above the roof bow serves to cover at least a cross-car middle portion of all of the stored roof, and a majority of the roof is pliable.

28. The vehicle of claim 25, wherein the upper surface of the roof bow is substantially flush with a horizontal plane defined by a beltline of the vehicle body when in its retracted position.

29. The vehicle of claim 25, wherein there are essentially no structural body panels upwardly protruding from a vehicle beltline rearward of a pair of A-pillars when the roof is fully retracted and the side windows are retracted.

30. An automotive vehicle comprising:
- a vehicle body having a windshield header and a substantially vertical and rearmost body panel, the body further having a passenger compartment and a storage compartment, the storage compartment being rearward of the passenger compartment;
- a convertible roof covering the passenger and storage compartments, and extending essentially from the windshield header to the rearmost body panel when in a raised position; and
- a forwardmost roof bow attached to the roof, the roof bow having an upper surface that remains upwardly facing when in both its raised and retracted positions; and
- a back window and side windows attached to the roof.

31. The vehicle of claim 30, wherein the storage compartment is configured to receive miscellaneous removable objects even when the roof is in its retracted position, and at least a majority of the roof being of a soft-top variety.

32. The vehicle of claim 30, wherein the storage compartment is accessible from outside and rear of the body when the roof is in its raised and retracted positions, and the vehicle is a sport utility vehicle.

33. An automotive convertible roof comprising:
- a pliable roof cover;
- a forwardmost roof bow attached to the cover;
- a number four roof bow supporting the cover; and
- a rigid back window;
- the roof cover, roof bows and back window all being movable between raised and retracted positions; and
- the number four roof bow always moving with and being supported by the back window.

34. The roof of claim 33, wherein the forwardmost roof bow has a substantially flat section that is upwardly facing when in both its fully raised and fully retracted positions.

35. The roof of claim 34, wherein the back window is fully retracted to a substantially horizontal orientation below the section of the forwardmost roof bow.

36. The roof of claim 33, further comprising a frame attached to at least an upper periphery of the back window and the number four roof bow being secured to the frame.

37. The roof of claim 33, wherein the roof cover is retractable to a stowed position adjacent a vehicle tailgate with an outer and forward portion of the roof cover being externally visible from outside the vehicle when in the stowed position.

38. An automotive vehicle comprising:
- a vehicle body having a windshield header and a substantially vertical and rearmost body panel, the body further having a passenger compartment and a storage compartment, the storage compartment being rearward of the passenger compartment;
- a convertible roof covering the passenger and storage compartments, and extending essentially from the windshield header to the rearmost body panel when in a raised position;
- a back window and side windows attached to the roof; and
- a forwardmost section of the roof being substantially flush with a beltline of the vehicle body when in its retracted position.

39. The vehicle of claim 38, wherein the storage compartment operably receives the roof when in its retracted position.

40. The vehicle of claim 38, wherein the storage compartment is configured to receive miscellaneous removable objects even when the roof is in its retracted position, and at least a majority of the roof being of a soft-top variety.

41. The vehicle of claim 38, further comprising a forwardmost roof bow having a substantially flat section that is upwardly facing when in both its fully raised and fully retracted positions.

42. The vehicle of claim 41, further comprising a rigid back window fully retracted to a substantially horizontal orientation, the window being coupled to the roof.

43. The vehicle of claim 38, wherein the storage compartment is accessible from outside and rear of the body when the roof is in its raised and retracted positions.

44. The vehicle of claim 38, wherein the roof is retractable to a stowed position adjacent a vehicle tailgate with an outer and forward fabric portion of the roof being externally visible from outside the vehicle when in the stowed position.

45. An automotive vehicle comprising:
- a vehicle body having a windshield header and a substantially vertical and rearmost body panel, the body further having a passenger compartment and a storage compartment, the storage compartment being accessible from and being rearward of the passenger compartment;
- a convertible roof covering the passenger and storage compartments, and extending essentially from the windshield header to the rearmost body panel when in a raised position; and
- a back window and side windows attached to the roof, the roof being of a soft-top variety;
- wherein the storage compartment operably receives the roof when in its retracted position; and
- wherein the storage compartment is configured to receive miscellaneous removable objects even when the roof is in its retracted position.

46. The vehicle of claim 45, further comprising a forwardmost roof bow having a substantially flat section that is upwardly facing when in both its fully raised and fully retracted positions.

47. The vehicle of claim 46, further comprising a rigid back window being fully retracted to a substantially horizontal orientation below the section of the forwardmost roof bow.

48. The vehicle of claim 45, wherein the back window and side windows are rigid.

49. The vehicle of claim 45, further comprising a retractable and rigid back window and a roof bow mounted above the back window when raised, the back window and the roof bow always moving together.

50. An automotive convertible roof, folding mechanism comprising:
- a first link pivotally attached to a first location;
- a second link pivotally attached to a second location;
- a supplemental link pivotally attaching the first link to the second link;
- a third back window link pivotally attached to a third location; and
- a fourth back window link having one end section pivotally coupled to the second link and another end section pivotally coupled to the third back window link.

51. The mechanism of claim 50, further comprising a back window peripherally attached to a frame having a substantially inverted U-shape, a leg of the frame being pivotally attached to the third back window link.

52. The mechanism of claim 51, wherein the back window frame rotates about its pivot connection with the third back window control link in a direction that is opposite to the direction that the third back window link rotates about the third location when moved between its extended and retracted positions.

53. The mechanism of claim 50, further comprising a rigid back window having an exterior surface that is rearwardly facing when in its extended position, and the exterior surface of the back window facing in a substantially downward direction when in its retracted position;
- the first link being a front roof section drive link, the second link being a front roof section balance link, the third link being a back window control link, and the fourth link being a back window control link.

* * * * *